US009830896B2

(12) United States Patent
Wang et al.

(10) Patent No.: US 9,830,896 B2
(45) Date of Patent: Nov. 28, 2017

(54) AUDIO PROCESSING METHOD AND AUDIO PROCESSING APPARATUS, AND TRAINING METHOD

(71) Applicant: Dolby Laboratories Licensing Corporation, San Francisco, CA (US)

(72) Inventors: Jun Wang, Beijing (CN); Lie Lu, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 593 days.

(21) Appl. No.: 14/282,654

(22) Filed: May 20, 2014

(65) Prior Publication Data

US 2014/0358265 A1 Dec. 4, 2014

Related U.S. Application Data

(60) Provisional application No. 61/837,275, filed on Jun. 20, 2013.

(30) Foreign Application Priority Data

May 31, 2013 (CN) .......................... 2013 1 0214901

(51) Int. Cl.
*G06F 17/00* (2006.01)
*G10H 1/40* (2006.01)

(52) U.S. Cl.
CPC ......... *G10H 1/40* (2013.01); *G10H 2210/041* (2013.01); *G10H 2210/051* (2013.01);
(Continued)

(58) Field of Classification Search
CPC ............... G10H 1/40; G10H 2210/041; G10H 2210/051; G10H 2210/076;
(Continued)

(56) References Cited

U.S. PATENT DOCUMENTS 7,000,200 B1 2/2006 Martins
7,612,275 B2 11/2009 Seppanen
(Continued)

FOREIGN PATENT DOCUMENTS

WO 2007/072394 6/2007

OTHER PUBLICATIONS

Bock, S. et al "Enhanced Beat Tracking with Context-Aware Neural Networks" Proc. of the 14th Int. Conference on Digital Audio Effects, Paris, France, Sep. 19-23, 2011.
(Continued)

*Primary Examiner* — Fan Tsang
*Assistant Examiner* — Eugene Zhao

(57) ABSTRACT

Audio processing method and audio processing apparatus, and training method are described. According to embodiments of the application, an accent identifier is used to identify accent frames from a plurality of audio frames, resulting in an accent sequence comprised of probability scores of accent and/or non-accent decisions with respect to the plurality of audio frames. Then a tempo estimator is used to estimate a tempo sequence of the plurality of audio frames based on the accent sequence. The embodiments can be well adaptive to the change of tempo, and can be further used to tracking beats properly.

20 Claims, 15 Drawing Sheets

(52) U.S. Cl.
CPC . *G10H 2210/076* (2013.01); *G10H 2240/075* (2013.01); *G10H 2250/015* (2013.01)

(58) Field of Classification Search
CPC ....... G10H 2240/075; G10H 2250/015; G10H 1/42; G10H 2250/021
See application file for complete search history.

(56) References Cited

U.S. PATENT DOCUMENTS

| | | | | |
|---|---|---|---|---|
| 8,071,869 | B2 | 12/2011 | Chen | |
| 2005/0247185 | A1* | 11/2005 | Uhle | G10H 1/40 84/616 |
| 2007/0008956 | A1 | 1/2007 | Moran | |
| 2009/0055006 | A1* | 2/2009 | Asano | G06F 17/30029 700/94 |
| 2009/0287323 | A1 | 11/2009 | Kobayashi | |
| 2010/0126332 | A1 | 5/2010 | Kobayashi | |
| 2010/0131086 | A1 | 5/2010 | Itoyama | |
| 2010/0186576 | A1 | 7/2010 | Kobayashi | |
| 2016/0005387 | A1* | 1/2016 | Eronen | G10H 1/40 84/611 |

OTHER PUBLICATIONS

Gouyon, F. et al "Evaluating Low Level Features for Beat Classification and Tracking" IEEE International Conference on Acoustics, Speech and Signal Processing, vol. 4; pp. IV-1309-IV-1312, Apr. 15-20, 2007.

Virtanen, T. et al "Bayesian Extensions to Non-Negative Matrix Factorisation for Audio Signal Modelling", Acoustics, Speech and Signal Processing, 2008. ICASSP 2008. IEEE International Conference on, Mar. 31, 2008-Apr. 4, 2008.

Fulop, S.A. et al "Algorithms for Computing the Time-Corrected Instantenous Frequency (Reassigned) Spectogram, with Applications", Acoust. Soc. Am. 119(1), Jan. 2006, pp. 360-371.

Schuster, M. et al "Bidirectional Recurrent Neural Networks", IEEE Transactions on Signal Processing, vol. 45, No. 11, Nov. 1997.

Freund, Y. et al "A Short Introduction to Boosting", Journal of Japanese Society for Artificial Intelligence 14(5): 771-780, Sep. 1999.

Hall, M. et al "The WEKA Data Mining Software: an Update", ACM SIGKDD Explorations Newsletter archive, vol. 11, Issue 1, Jun. 2009.

Hall, M.A. "Correlation-Based Feature Subset Selection for Machine Learning", Department of Computer Science, Thesis, Hamilton, New Zealand, Apr. 1999.

Grosche, P. et al "Cyclic Tempogram—A Mid-level Tempo Representation for Music Signals" IEEE International Conference on Acoustics Speech and Signal Processing, Mar. 14-19, 2010, pp. 5522-5525.

Rabiner, L.R. "Tutorial on Hidden Markov Models and Selected Applications in Speech Recognition", Proc. of the IEEE, vol. 77, No. 2, pp. 257-286, Feb. 1989.

* cited by examiner

AUDIO PROCESSING METHOD AND AUDIO PROCESSING APPARATUS, AND TRAINING METHOD

CROSS REFERENCE TO RELATED APPLICATIONS

This application claims benefit of priority to related, U.S. Provisional Patent Application No. 61/837,275 filed on Jun. 20, 2013 entitled "Audio Processing Method and Audio Processing Apparatus, and Training Method" and Chinese Patent Application number 201310214901.6 filed in May 31, 2013 entitled "Audio Processing Method and Audio Processing Apparatus, and Training Method" which are incorporated herein by reference in its entirely.

TECHNICAL FIELD

The present invention relates generally to audio signal processing. More specifically, embodiments of the present invention relate to audio processing methods and audio processing apparatus for estimating tempo values of an audio segment, and a training method for training an audio classifier.

BACKGROUND

Although some existing tempo estimating methods are very successful, there are still certain limitations and problems with them. For example, they apply primarily to a constrained range of genres and instruments such as pop-dance music with drum in a static tempo or with "strong beats". However, it is challenging to maintain the performance/accuracy while confronting a wide diversity of music such as those with soft notes, with time-varying tempos, or with very noisy and complex musical onset representations.

SUMMARY

According to an embodiment of the present application, an audio processing apparatus is provided, comprising: an accent identifier for identifying accent frames from a plurality of audio frames, resulting in an accent sequence comprised of probability scores of accent and/or non-accent decisions with respect to the plurality of audio frames; and a tempo estimator for estimating a tempo sequence of the plurality of audio frames based on the accent sequence.

According to another embodiment, an audio processing method is provided, comprising: identifying accent frames from a plurality of audio frames, resulting in an accent sequence comprised of probability scores of accent and/or non-accent decisions with respect to the plurality of audio frames; and estimating a tempo sequence of the plurality of audio frames based on the accent sequence.

According to yet another embodiment, a method for training an audio classifier for identifying accent/non-accent frames in an audio segment is provided, comprising: transforming a training audio segment into a plurality of frames; labeling accent frames among the plurality of frames; selecting randomly at least one frame from between two adjacent accent frames, and labeling it as non-accent frame; and training the audio classifier using the accent frames plus the non-accent frames as training dataset.

Yet another embodiment involves a computer-readable medium having computer program instructions recorded thereon, when being executed by a processor, the instructions enabling the processor to execute an audio processing method as described above.

Yet another embodiment involves a computer-readable medium having computer program instructions recorded thereon, when being executed by a processor, the instructions enabling the processor to execute a method for training an audio classifier for identifying accent/non-accent frames in an audio segment as described above.

According to the embodiments of the present application, the audio processing apparatus and methods can, at least, be well adaptive to the change of tempo, and can be further used to tracking beats properly.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
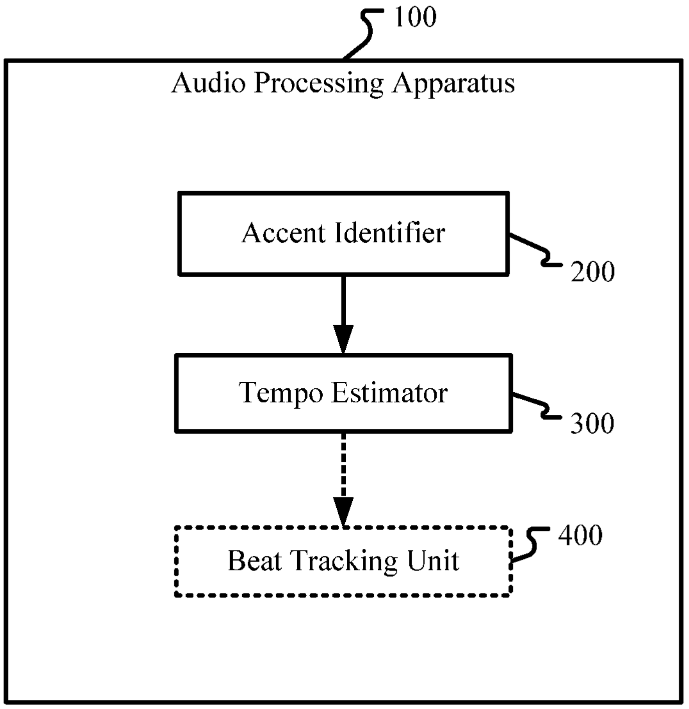
FIG. 1 is a block diagram illustrating an example audio processing apparatus 100 according to embodiments of the invention.

The embodiments of the present invention are below described by referring to the drawings. It is to be noted that, for purpose of clarity, representations and descriptions about those components and processes known by those skilled in the art but not necessary to understand the present invention are omitted in the drawings and the description.

As will be appreciated by one skilled in the art, aspects of the present invention may be embodied as a system, a device (e.g., a cellular telephone, a portable media player, a personal computer, a server, a television set-top box, or a digital video recorder, or any other media player), a method or a computer program product. Accordingly, aspects of the present invention may take the form of a hardware embodiment, a software embodiment (including firmware, resident software, microcodes, etc.) or an embodiment combining both software and hardware aspects that may all generally be referred to herein as a "circuit," "module" or "system." Furthermore, aspects of the present invention may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic or optical signal, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Overall Solutions

FIG. 1 is a block diagram illustrating an example audio processing apparatus 100 according to embodiments of the present application.

As shown in FIG. 1, in a first embodiment, the audio processing apparatus 100 may comprises an accent identifier 200 and a tempo estimator 300. In a second embodiment, the audio processing apparatus 100 may further comprise a beat tracking unit 400, which will be described later.

The first embodiment will be described below.

In the accent identifier 200, accent frames are identified from a plurality of audio frames, resulting in an accent sequence comprised of probability scores of accent and/or non-accent decisions with respect to the plurality of audio frames. In the tempo estimator 300, a tempo sequence of the plurality of audio frames is estimated based on the accent sequence obtained by the accent identifier 200.

The plurality of audio frames may be prepared by any existing techniques. The input audio signal may be re-sampled into mono signal with a pre-defined sampling rate, and then divided into frames. But the present application is not limited thereto, and audio frames on multiple channels may also be processed with the solutions in the present application.

The audio frames may be successive to each other, but may also be overlapped with each other to some extent for the purpose of the present application. As an exemplary implementation, an audio signal may be re-sampled to 44.1 kHz, and divided into 2048-sample (0.0464 seconds) frames with 512-sample hop size. That is, the overlapped portion occupies 75% of a frame. Of course, the re-sampling frequency, the sample numbers in a frame and the hop size (and thus the overlapping ratio) may be other values.

The accent identifier 200 may work in either time domain or frequency domain. In other words, each of the plurality of audio frames may be in the form of time-variable signal, or may be transformed into various spectrums, such as frequency spectrum or energy spectrum. For example, each audio frame may be converted into FFT frequency domain. A short-time Fourier transform (STFT) may be used to obtain a spectrum for each audio frame:

$$X(t,k), k=1,2, \ldots, K. \qquad (1)$$

Where K is the number of Fourier coefficients for an audio frame, t is temporally sequential number (index) of the audio frame.

Other kinds of spectrum may also be used, such as Time-Corrected Instantaneous Frequency (TCIF) spectrum, or Complex Quadrature Minor Filter (CQMF) transformed spectrum, and the spectrum may also be represented with X(t,k).

The term “accent” used herein means, in music, an emphasis placed on a particular note. Accents contribute to the articulation and prosody of a performance of a musical phrase. Compared to surrounding notes: 1) A dynamic accent or stress accent is an emphasis using louder sound, typically most pronounced on the attack of the sound; 2) A tonic accent is an emphasis on notes by virtue of being higher in pitch as opposed to higher in volume; and 3) An agogic accent is an emphasis by virtue of being longer in duration. In addition, in rhythmic context, accents have some perceptual properties, for example, generally percussive sounds, bass, etc may be considered as accents.

The present application is not limited to accents in music. In some applications, “accent” may mean phonetic prominence given to a particular syllable in a word, or to a particular word within a phrase. When this prominence is produced through greater dynamic force, typically signalled by a combination of amplitude (volume), syllable or vowel length, full articulation of the vowel, and a non-distinctive change in pitch, the result is called stress accent, dynamic accent, or simply stress; when it is produced through pitch alone, it is called pitch accent; and when it is produced through length alone it is called quantitative accent.

In other audio signals than music or speech, accents may also exist, such as in the rhythm of heart, or clapping, and may be described with properties similar to above.

Figure 2:
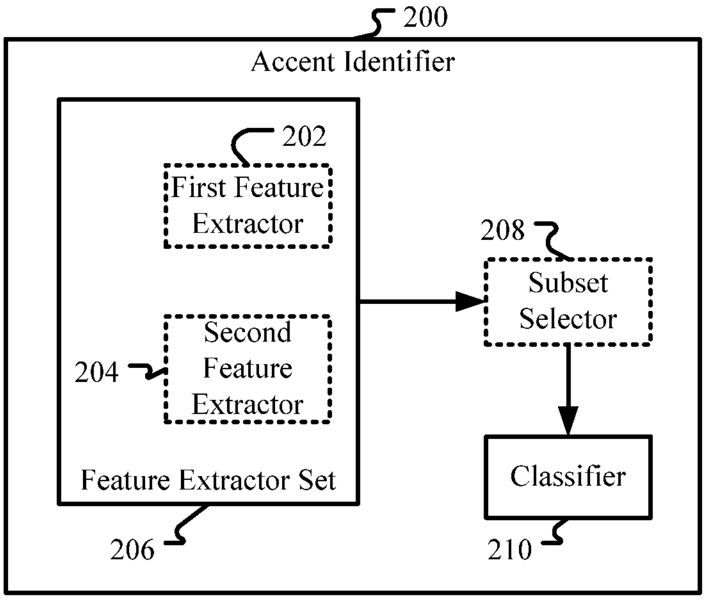
FIG. 2 is a block diagram illustrating the accent identifier 200 comprised in the audio processing apparatus 100.

The definition of “accent” described above implies inherent properties of accents in an audio signal or audio frames. Based on such inherent properties, in the accent identifier 200 features may be extracted and audio frames may be classified based on the features. In other words, the accent identifier 200 may comprises a machine-learning based classifier 210 (FIG. 2)

The features may include, for example, a complex domain feature combining spectral amplitude and phase information, or any other features reflecting one or more facets of the music rhythmic properties. More features may include timbre-related features consisting of at least one of Mel-frequency Cepstral Coefficients (MFCC), spectral centroid, spectral roll-off, energy-related features consisting of at least one of spectrum fluctuation (spectral flux), Mel energy distribution, and melody-related features consisting of bass Chroma and Chroma. For example, the changing positions of Chroma always indicate chord changes which are by and large the downbeat points for certain music styles.

These features may be extracted with existing techniques. The corresponding hardware components or software modules are indicated with “feature extractor set” 206 in FIG. 2.

As a modification to the embodiment, the accent identifier 200 may comprise as many feature extractors as possible in the feature extractor set 206 and obtain a feature set comprising as many features as possible. Then a subset selector 208 (FIG. 2) may be used to select a proper subset of the extracted features to be used by the classifier 210 to classify the present audio signal or audio frame. This can be done with existing adaptive classification techniques, by which proper features may be selected based on the contents of the objects to be classified.

The classifier 210 may be any type of classifier in the art. In one embodiment, Bidirectional Long Short Term Memory (BLSTM) may be adopted as the classifier 210. It is a neural network learning model, where ‘Bidirectional’ means the input is presented forwards and backwards to two separate recurrent nets, both of which are connected to the same output layer, and ‘long short term memory’ means an alternative neural architecture capable of learning long time-dependencies, which is proven in our experiment well suited to tasks such as accent/non-accent classification. AdaBoost can also be adopted as an alternative algorithm for the accent/non-accent classification. Conceptually, AdaBoost builds a strong classifier by combining a sequence of weak classifiers, with an adaptive weight for each weak classifier according to its error rate. A variety of classifiers can also be used for this task, such as Support Vector Machine (SVM), Hidden Markov Model (HMM), Gaussian Mixture Model (GMM), and Decision Tree (DT).

Figure 3:
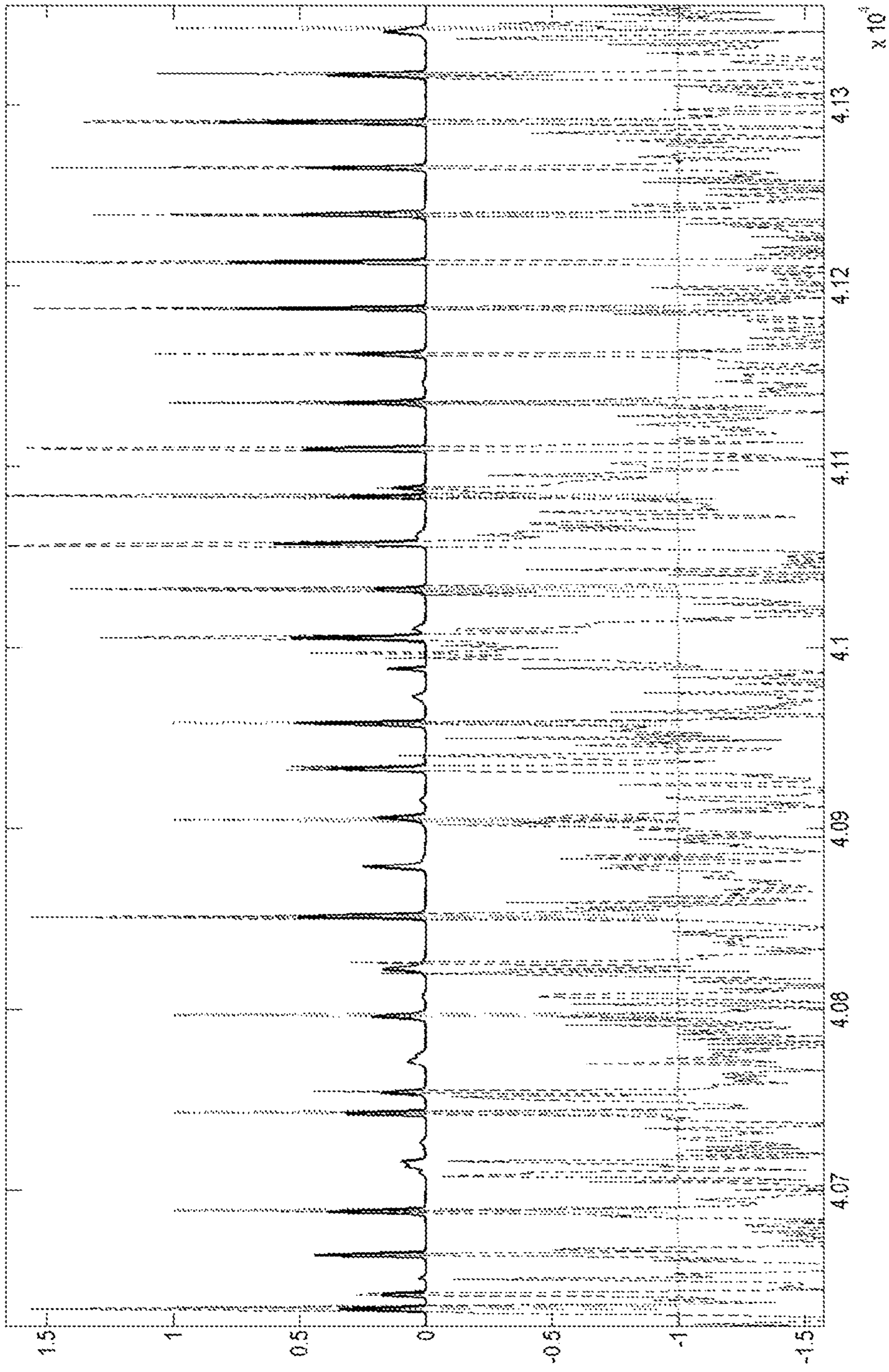
FIG. 3 is a graph showing the outputs by different audio classifiers for a piece of dance music.
Figure 4:
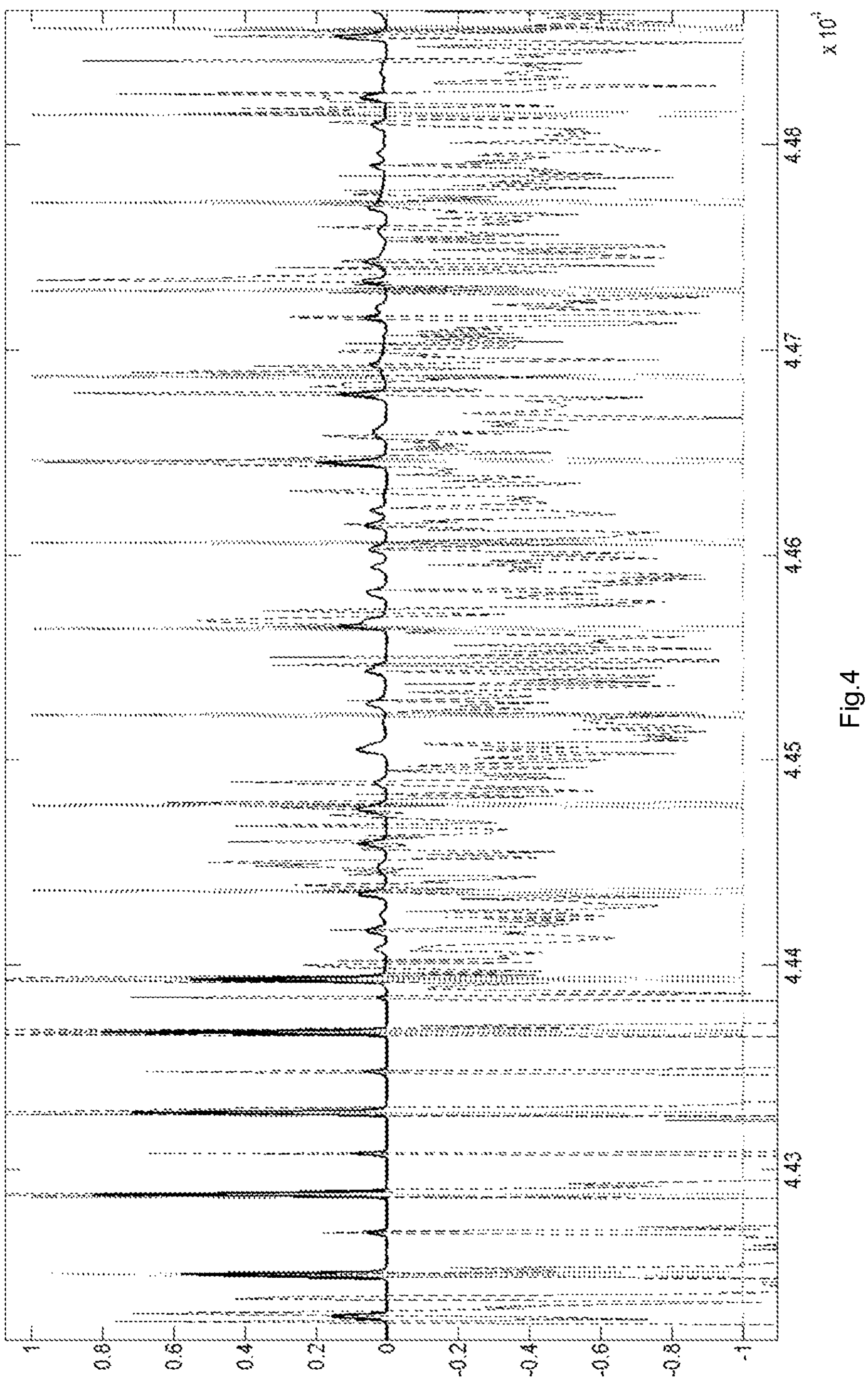
FIG. 4 is a graph showing the outputs by different audio classifiers for a concatenated signal in which the first piece is a music segment containing rhythmic beats and the latter piece is a non-rhythmic audio without beats.

Among various classifiers, BLSTM is preferable for estimating posterior probabilities of accents. Other classification approaches such as AdaBoost and SVM maximize differences between positive and negative classes, but result in a large imbalance between them, especially for infrequent positive samples (e.g., accent samples), whereas BLSTM doesn’t suffer from such an issue. Furthermore, for classification approaches such as AdaBoost and SVM, long-term information is lost since features such as the first and the second order differences of spectral flux and MFCC only carry short-term sequence information but not the long-term information. In contrast, the bidirectional structure of BLSTM can encode long term information in both directions, hence it is more appropriate for accent tracking tasks. Our evaluations show that BLSTM gives consistently improved performance for accent classification comparing to the conventional classifiers. FIG. 3 (the abscissa axis is frame index number) illustrates estimation outputs for a piece of rhythmic music segment by different algorithms: solid line indicates the activation output by BLSTM, dashed line indicates the probabilistic output by AdaBoost, and dotted line indicates the ground truth beat position. It shows that the BLSTM output is significantly less noisy and more aligned to the accent position ground truth than the AdaBoost output. FIG. 4 (the abscissa axis is frame index number) illustrates estimation outputs for a concatenated signal in which the first piece is a music segment containing rhythmic beats and the latter piece is a non-rhythmic audio without beats. It shows that the activation output by BLSTM (solid line) is significantly lower in the latter audio segments than that in the former music segment, and contains much fewer noisy peaks in the latter piece comparing to the output by AdaBoost (dashed line). Similar to FIG. 3, the dotted line indicates the ground truth beat position.

The classifier 210 may be trained before hand with any conventional approach. That is, in a dataset to train an accent/non-accent classifier, each frame in the dataset is labelled as accent or non-accent class. However, the two classes are very unbalanced as the non-accent frames are much more than the accent frames. To alleviate the unbalance problem, it is proposed in the present application that non-accent frames are generated by randomly selecting at least one frame between each pair of accent frames.

Figure 5:
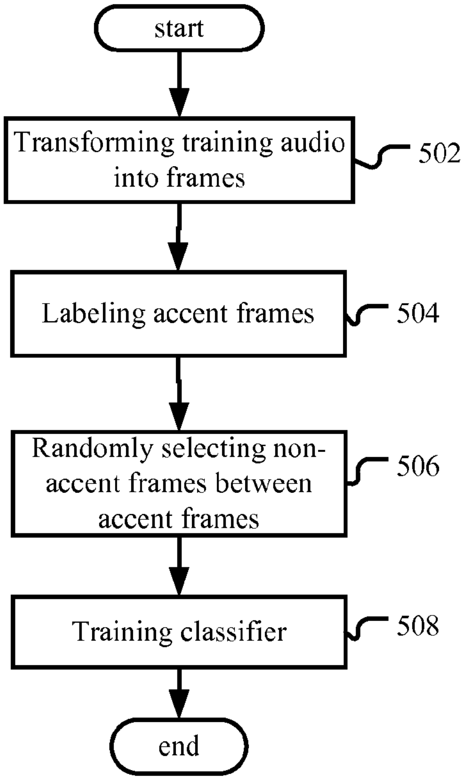
FIG. 5 is a flowchart illustrating a method for training an audio classifier used in embodiments of the audio processing apparatus.

Therefore, in the present application a method for training an audio classifier for identifying accent/non-accent frames in an audio segment is also provided, as shown in FIG. 5. That is, a training audio segment is firstly transformed into a plurality of frames (step 502), which may be either overlapped or non-overlapped with each other. Among the plurality of frames, accent frames are labelled (step 504). Although those frames between accent frames are naturally non-accent frames, but not all of them are taken into the training dataset. Instead, only a portion of the non-accent frames are labelled and taken into the data set. For example, we may randomly select at least one frame from between two adjacent accent frames, and label it as a non-accent frame (step 506). Then the audio classifier may be trained using both the labelled accent frames and the labelled non-accent frames as training dataset (step 508).

Then return to FIG. 1, after the processing of the accent identifier 200, a tempo estimator 300 is used to estimate a tempo sequence based on the accent sequence obtained by the accent identifier 200.

In musical terminology, tempo is the speed or pace of a given piece. Tempo is usually indicated in beats per minute (BPM). This means that a particular note value (for example, a quarter note or crotchet) is specified as the beat, and a certain number of these beats must be played per minute. The greater the tempo, the larger the number of beats that must be played in a minute is, and, therefore, the faster a piece must be played. The beat is the basic unit of time, the pulse of the mensural level. Beat relates to the rhythmic element of music. Rhythm in music is characterized by a repeating sequence of stressed and unstressed beats (often called "strong" and "weak").

The present application is not limited to music. For other audio signals than music, tempo and beat may have similar meaning and correspondingly similar physical properties.

Basically, all beats are accents, but not all accents are beats, although there are also some exceptions where some beats are not accents. Considering there are more accents than beats, it will be more accurate to estimate the tempo based on accents than based on beats. Therefore, in the present application, it is proposed to estimate the tempo value through detecting accents. Specifically, the tempo estimator 300 estimates a tempo sequence based on the accent sequence obtained by the accent identifier 200. Moreover, rather than estimating a single constant tempo value, the tempo estimator 300 obtains a tempo sequence, which may consist of a sequence of tempo values varying with frames, that is varying with time. In other words, each frame (or every several frames) has its (or their) own tempo value.

The tempo estimator 300 may be realized with any periodicity estimating techniques. If periodicity is found in an audio segment (in the form of an accent sequence), the period $\tau$ corresponds to a tempo value.

Possible periodicity estimating techniques may include autocorrelation function (ACF), wherein the autocorrelation value at a specific lag reflects the probability score of the lag (which corresponds to the period $\tau$, and further corresponds to the tempo value); comb filtering, wherein the cross-correlation value at a specific period/lag $\tau$ reflects the probability score of the period/lag; histogram technique, wherein the occurrence probability/count of the period/lag between every two detected accents may reflect the probability score of the period/lag; periodicity transform such as Fast Fourier Transform FFT (here it is the accent sequence, not the original audio signal/frames, that is Fourier transformed), wherein the FFT value at a certain period/lag $\tau$ may reflect the probability score of the period/lag; and multi-agent based induction method, wherein a goodness/matchness by using a specific period/lag $\tau$ (representing an agent) in tempo tracking/estimation may reflect the probability score of the period/lag. In each possible technique, for a specific frame or a specific audio segment, the period/lag with the highest probability score shall be selected.

The audio processing apparatus 100 may, in a second embodiment, further comprises a beat tracking unit 400 for estimating a sequence of beat positions in a section of the accent sequence based on the tempo sequence. Again, since the estimated tempo sequence may well reflect the variation of the tempo, the estimated beat positions will not be in a constant periodicity and may well match the changing tempo values. Compared with conventional techniques of directly estimating beat positions (then estimating tempo values based thereon), the present embodiments of firstly estimating tempo values based on accent estimation, then estimating beat positions based on the tempo values may obtain more accurate results.

A specific tempo value corresponds to a specific period or inter-beat duration (lag). Therefore, if one ground truth beat position is obtained, then all other beat positions may be obtained according to the tempo sequence. The one ground truth beat position may be called a "seed" of the beat positions.

In the present application, the beat position seed may be estimated using any techniques. For example, the accent in the accent sequence with the highest probability score may be taken as the beat position seed. Or any other existing techniques for beat estimation may be used, but only to obtain the seed, not all the beat positions, because the other beat positions will be determined based on the tempo sequence. Such existing techniques may include but not limited to peak picking method, machine-learning based beat classifier or pattern-recognition based beat identifier.

Attack Saliency Feature

In a third embodiment, a new feature is proposed to enrich the feature space used by the classifier 210 (and/or the subset selector 208), and improve the performance of the classifier 210 and thus the performance of the accent identifier 200 significantly. The new feature may be called "attack saliency feature", but it should be noted that the nomination of the feature is not intended to limit the feature and the present application in any sense.

Accordingly, a first feature extractor 202 (FIGS. 2 and 7) is added into the feature extractor set 206 for extracting at least one attack saliency feature from each audio frame. And the classifier 210 may be configured to classify the plurality of audio frames at least based on the at least one attack saliency feature, and/or the subset selector 208 may be configured to select proper features from the feature set comprising at least the at least one attack saliency feature.

Simply speaking, an attack saliency feature represents the proportion that an elementary attack sound component takes in an audio frame. The term "attack" means a perceptible sound impulse or a perceptible start/onset of an auditory sound event. Examples of "attack" sound may include the sounds of percussive instruments, such as hat, cymbal or drum, including snare-drum, kick, tom, bass drum, etc., the sounds of hand-clapping or stamping, etc. The attack sound has its own physical properties and may be decomposed into a series of elementary attack sound components which may be regarded as characterizing the attack sound. Therefore, the proportion of an elementary attack sound component in an audio frame may be used as the attack saliency feature indicating to what extent the audio frame sounds like an attack and thus is possible to be an accent.

The elementary attack sound components may be known beforehand. On one aspect, the elementary attack sound components may be learned from a collection of various attack sound sources like those listed in the previous paragraph. For this purpose, any decomposition algorithms or source separation methods may be adopted, such as Non-negative Matrix Factorization (NMF) algorithm, Principle Component Analysis (PCA) and Independent Component Analysis (ICA). That is, it can be regarded that a general attack sound source generalized from the collection of various attack sound sources is decomposed into a plurality of elementary attack sound components (still taking STFT spectrum as an example, but other spectrums are also feasible):

$$X_s(t,k)=A(t,n)*D(n,k)=[A_{att}(t,1),A_{att}(t,2),\ldots,A_{att}(t,N)]*[D_{att}(1,k),D_{att}(2,k),\ldots,D_{att}(N,k)]' \quad (2)$$

Where $X_s(t,k)$ is the attack sound source, k=1, 2, . . . , K, K is the number of Fourier coefficients for an audio frame, t is temporally sequential number (index) of the audio frame, $D(n,k)=[D_{att}(1,k), D_{att}(2,k), \ldots, D_{att}(N,k)]'$ is elementary attack sound components, n=1, 2, . . . , N, and N is the number of elementary attack sound components, $A(t,n)=[A_{att}(t,1), A_{att}(t,2), \ldots, A_{att}(t,N)]$ is a matrix of mixing factors of respective elementary attack sound components.

In the learning stage, through the decomposition algorithm or source separation method stated above, but not limited thereto, both the matrix of mixing factors A(t,n) and the set of elementary attack sound components D(n,k) may be obtained, but we need only D(n,k) and A(t,n) may be discarded.

Figure 6:
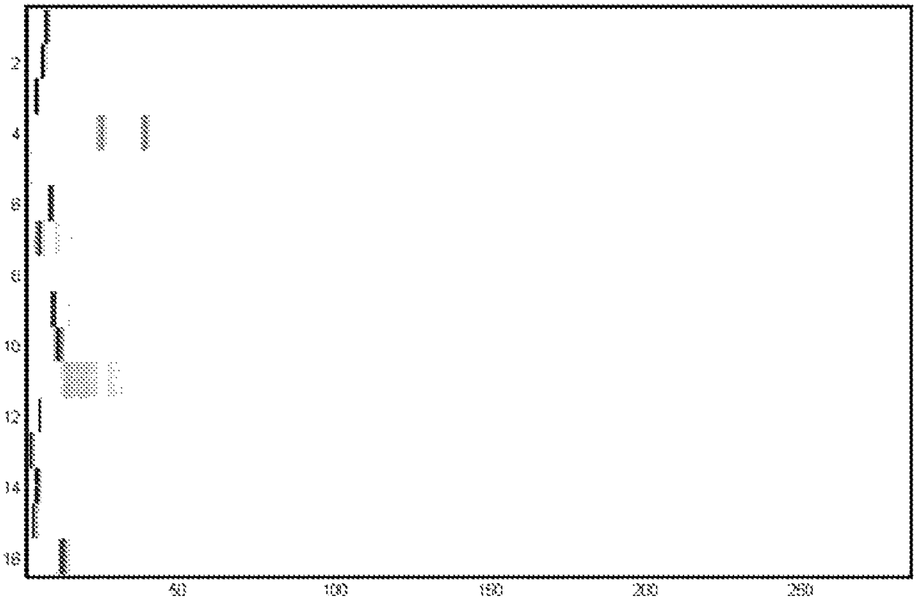
FIG. 6 illustrates an example set of elementary attack sound components, where x-axis indicates frequency bins and y-axis indicates the component indexes.

FIG. 6 gives an example of a set of elementary attack sound components, where x-axis indicates frequency bins and y-axis indicates the component indexes. The greyed bars indicate the levels of respective frequency bins. The darker the bar is, the higher the level is.

Then, in the accent identifier 200, the first feature extractor 202 uses the same or similar decomposition algorithm or source separation method to decompose an audio frame to be processed into at least one of the elementary attack sound components D(n,k) obtained in the learning stage, resulting a matrix of mixing factors, which may collectively or individually be used as the at least one attack saliency feature. That is, $$X(t,k)=F(t,n)*D(n,k)=[F_{att}(t,1),F_{att}(t,2),\ldots,F_{att}(t,N)]*[D_{att}(1,k),D_{att}(2,k),\ldots,D_{att}(N,k)]' \quad (3)$$

Where X(t,k) is the audio frame obtained in equation (1), k=1, 2, . . . , K, K is the number of Fourier coefficients for an audio frame, t is temporally sequential number (index) of the audio frame, D(n,k) is elementary attack sound components obtained in equation (2), n=1, 2, . . . , N, and N is the number of elementary attack sound components, $F(t,n)=[F_{att}(t,1), F_{att}(t,2), \ldots, F_{att}(t,N)]$ is a matrix of mixing factors of respective elementary attack sound components. The matrix F(t,n) as a whole, or any element in the matrix, may used as the at least one attack saliency feature. The matrix of mixing factors may be further processed to derive the attack saliency feature, such as some statistics of the mixing factors, a linear/nonlinear combination of some or all the mixing factors, etc.

In a variant of the embodiment, the at least one elementary attack sound component may also be derived beforehand from musicology knowledge by manually construction. This is because an attack sound source has its inherent physical properties and has its own specific spectrum. Then, based on knowledge about the spectrum properties of the attack sound sources, elementary attack sound components may be constructed manually.

In a further variant of the embodiment, non-attack sound components may also be considered, since even an attack sound source such as a percussive instrument may comprise some non-attack sound components, which however are also characteristics of the attack sound source such as the percussive instrument. And in a real piece of music, it is the whole sound of the percussive instrument, such as a drum, rather than only some components of the drum, to indicate the accents or beats in the music. From another viewpoint, even if finally the mixing factors of the non-attack sound components are not considered in the attack saliency features, more accurate results may be obtained if the decomposition algorithm takes into account all possible components including non-attack sound component; in other words, with non-attack components taken into account, we can properly decompose all kinds of audio signals even if they contain more or less non-attack sound components or are mostly or entirely comprised of non-attack sound component.

Accordingly, in the learning stage, the sound source may be decomposed as follows:

$$X_s(t,k)=A(t,n)*D(n,k)=[A_{att}(t,1),A_{att}(t,2),\ldots,A_{att}(t,N_1),A_{non}(t,N_1+1),A_{non}(t,N_1+2),\ldots,A_{non}(t,N_1+N_2)]*[D_{att}(1,k),D_{att}(2,k),\ldots,D_{att}(N_1,k),D_{non}(N_1+1,k),D_{non}(N_1+2,k),\ldots,D_{non}(N_1+N_2,k)]' \quad (4)$$

Where $X_s(t,k)$ is the attack sound source, k=1, 2, . . . , K, K is the number of Fourier coefficients for an audio frame, t is temporally sequential number (index) of the audio frame, $D(n,k)=[D_{att}(1,k), D_{att}(2,k), \ldots, D_{att}(N_1,k), D_{non}(N_1+1,k), D_{non}(N_1+2,k), \ldots, D_{non}(N_1+N_2,k)]'$ is elementary sound components, n=1, 2, . . . , $N_1+N_2$, wherein $N_1$ is the number of elementary attack sound components, and $N_2$ is the number of elementary non-attack sound components, $A(t,n)=[A_{att}(t,1), A_{att}(t,2), \ldots, A_{att}(t,N_1), A_{non}(t,N_1+1), A_{non}$ $(t,N_1+2), \ldots, A_{non}(t,N_1+N_2)]$ is a matrix of mixing factors of respective elementary sound components.

In a further variant, into the collection of sound sources in the learning stage, some non-attack sound sources may also be added, in addition to the attack sound sources. Such non-attack sound sources may include, for example, non-percussive instrument, singing voice, etc. In such a situation, in equation (4) $X_s(t,k)$ will comprise both attack sound sources and non-attack sound sources.

Then, in the accent identifier 200, the first feature extractor 202 uses the same or similar decomposition algorithm or source separation method to decompose an audio frame to be processed into at least one of the elementary sound components D(n,k) obtained in the learning stage, resulting a matrix of mixing factors, which may be collectively or individually used as the at least one attack saliency feature. That is, $$X(t,k) = F(t,n) * D(n,k) = [F_{att}(t,1), F_{att}(t,2), \ldots, F_{att}(t,N_1), F_{non}(t,N_1+1), F_{non}(t,N_1+2), \ldots, F_{non}(t,N_1+N_2)] * [D_{att}(1,k), D_{att}(2,k), \ldots, D_{att}(N_1,k), D_{non}(N_1+1,k), D_{non}(N_1+2,k), \ldots, D_{non}(N_1+N_2,k]' \quad (5)$$

Where X(t,k) is the audio frame obtained in equation (1), k=1, 2, . . . , K, K is the number of Fourier coefficients for an audio frame, t is temporally sequential number (index) of the audio frame, D(n,k) is elementary sound components obtained in equation (2), n=1, 2, . . . , $N_1+N_2$, wherein $N_1$ is the number of elementary attack sound components, and $N_2$ is the number of elementary non-attack sound components, F(t,n) is a matrix of mixing factors of respective elementary sound components. The matrix F(t,n) as a whole, or any element in the matrix, may used as the at least one attack saliency feature. The matrix of mixing factors may be further processed to derive the attack saliency feature, such as some statistics of the mixing factors, a linear/nonlinear combination of some or all the mixing factors, etc. As a further variant, although mixing factors $F_{non}(t,N_1+1)$, $F_{non}(t,N_1+2), \ldots, F_{non}(t,N_1+N_2)$ are also obtained for elementary non-attack sound components, only those mixing factors $F_{att}(t,1)$, $F_{att}(t,2), \ldots, F_{att}(t,N_1)$ for elementary attack sound components are considered when deriving the attack saliency feature.

Figure 7:
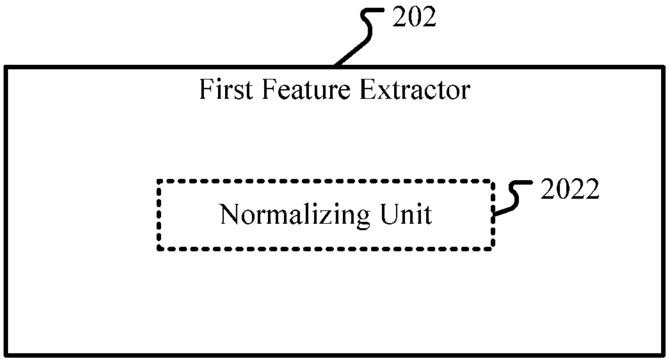
FIG. 7 illustrates a variant relating to the first feature extractor in the embodiments of the audio processing apparatus.

In a further variant shown in FIG. 7 relating to the first feature extractor 202, the first feature extractor 202 may comprise a normalizing unit 2022, for normalizing the at least one attack saliency feature of each audio frame with the energy of the audio frame. For avoiding abrupt fluctuation, the normalizing unit 2022 may be configured to normalize the at least one attack saliency feature of each audio frame with temporally smoothed energy of the audio frame. "Temporally smoothed energy of the audio frame" means the energy of the audio frame is smoothed in the dimension of the frame indexes. There are various ways for temporally smoothing. One is to calculate a moving average of the energy with a moving window, that is, a predetermined size of window is determined with reference to the present frame (the frame may be at the beginning, in the center or at the end of the window), an average of the energies of those frames in the window may be calculated as the smoothed energy of the present frame. In a variant thereof, a weighted average within the moving window may be calculated for, for example, putting more emphasis on the present frame, or the like. Another way is to calculate a history average. That is, the smoothed energy value of the present frame is a weighted sum of the un-smoothed energy of the present frame and at least one smoothed energy value of at least one earlier (usually the previous) frame. The weights may be adjusted depending on the importance of the present frame and the earlier frames.

Relative Strength Feature

In a fourth embodiment, a further new feature is proposed to enrich the feature space used by the classifier 210 (and/or the subset selector 208), and improve the performance of the classifier 210 and thus the performance of the accent identifier 200 significantly. The new feature may be called "relative strength feature", but it should be noted that the nomination of the feature is not intended to limit the feature and the present application in any sense.

Accordingly, a second feature extractor 202 (FIGS. 2 and 8) is added into the feature extractor set 206 for extracting at least one relative strength feature from each audio frame. And the classifier 210 may be configured to classify the plurality of audio frames at least based on the at least one relative strength feature, and/or the subset selector 208 may be configured to select proper features from the feature set comprising at least the at least one relative strength feature.

Simply speaking, a relative strength feature of an audio frame represents change of strength of the audio frame with respect to at least one adjacent audio frame. From the definition of accent, we know that an accent generally has larger strength than adjacent (previous or subsequent) audio frames, therefore we can use change of strength as the feature for identifying accent frame. If considering real-time processing, usually a previous frame may be used to calculate the change (in the present application the previous frame is taking as an example). However, if the processing is not necessarily in real time, then a subsequent frame may also be used. Or both may be used.

The change of strength may be computed based on the change of the signal energy or spectrum, such as energy spectrum or STFT spectrum. To more accurately track the instantaneous frequencies of signal components, a modification of the FFT spectrum may be exploited to derive the relative strength feature. This modified spectrum is called time-corrected instantaneous frequency (TCIF) spectrum. The process using this TCIF spectrum for extracting the relative strength feature is presented as following as an example, but the present application is not limited thereto and the following processing can be equally applied to other spectrums including energy spectrum.

In a variant, the relative strength feature may be calculated as a difference between the spectrums of two concerned audio frames:

$$\Delta X(t,k) = X(t,k) - X(t-1,k) \quad (6)$$

Where t−1 indicates the previous frame.

In an alternative to the variant above, a ratio between spectrums of concerned frames may be used instead of the difference.

In a further alternative, the spectrum may be converted to log-scale, and a log-scale difference between concerned frames may be calculated as the difference:

$$X_{log}(t,k) = \log(X(t,k)) \quad (7)$$

$$\Delta X_{log}(t,k) = X_{log}(t,k) - X_{log}(t-1,k) \quad (8)$$

Figure 8:
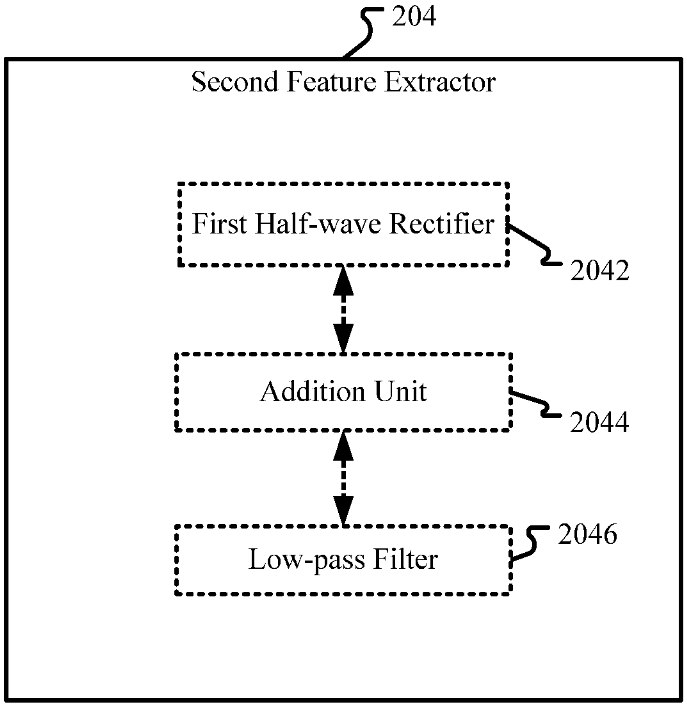
FIG. 8 illustrates embodiments and variants relating to the second feature extractor in the embodiments of the audio processing apparatus.

Then for each frame, K differences (or ratios) are obtained, each corresponding to a frequency bin. At least one of them may be used as the at least one relative strength feature. The differences (ratios) may be further processed to derive the relative strength feature, such as some statistics of the differences (or ratios), a linear/nonlinear combination of some or all the differences (or ratios), etc. For example, as shown in FIG. 8, an addition unit 2044 may be comprised in the second feature extractor 204, for summing the differences between concerned audio frames on some or all the K frequency bins. The sum may be used alone as a relative strength feature, or together with the differences over K frequency bins to form a vector of K+1 dimensions as the relative strength feature.

In a variant, the differences (including the log differences and the ratios) and/or the sum described above, may be subject to a half-wave rectification to shift the average of the differences and/or sum approximately to zero, and ignore those values lower than the average. Accordingly, a first half-wave rectifier 2042 (FIG. 8) may be provided in the second feature extractor 204. Specifically, the average may be a moving average or a history average as discussed at the end of the previous part "Attack Saliency Feature" of this disclosure. The half-wave rectification may be expressed with the following equation or any of its mathematic transform (taking log difference as an example):

$$\Delta X_{rect}(t,k) = \begin{cases} \Delta X\log(t,k) - \overline{\Delta X\log(t,k)}, & \text{if } \Delta X\log(t,k) > \overline{\Delta X\log(t,k)}, \\ 0, & \text{else.} \end{cases} \tag{9}$$

Where $\Delta X_{rect}(t,k)$ is the rectified difference after half-wave rectification, $\overline{\Delta X\log(t,k)}$ is the moving average or history average of $\Delta X\log(t,k)$.

In a further variant, as shown in FIG. 8, a low-pass filter 2046 may be provided in the second feature extractor, for filtering out redundant high-frequency components in the differences (ratios) and/or the sum in the dimension of time (that is, frames). An example of the low-pass filter is Gaussian smoothing filter, but not limited thereto.

Please note that the operations of the first half-wave rectifier 2042, the addition unit 2044 and the low-pass filter 2046 may be performed separately or in any combination and in any sequence. Accordingly, the second feature extractor 204 may comprise only one of them or any combination thereof.

In above description a TCIF spectrum is taken as an example and as stated before any spectrum including energy spectrum may be processed similarly. In a further variant, any spectrum may be converted onto Mel bands to form a Mel spectrum, which then may be subjected to the operations above. The conversion may be expressed as:

$$X(t,k) \rightarrow X_{mel}(t,k') \tag{10}$$

That is, the original spectrum X(t,k) on K frequency bins is converted into a Mel spectrum $X_{mel}(t,k')$ on K' Mel bands, where k=1, 2, . . . , K, and k'=1, 2, . . . , K'.

Then all the operations (equations (6)-(9), for example) of the second feature extractor 204, including any one of the first half-wave rectifier 2042, the addition unit 2044 and the low-pass filter 2046, may be performed on the Mel spectrum of each audio frame. Then K' differences (ratios, log differences) respectively on K'Mel bands may be obtained, at least one of them may be used as the at least one relative strength feature. If the addition unit is comprised, then the sum may be used alone as a relative strength feature, or together with the differences over K' Mel bands to form a vector of K'+1 dimensions as the relative strength feature. Generally K'=40. Since Mel bands can represent human auditory perception more accurately, the accent identifier 200 working on Mel bands can ensure the identified accents comply with human auditory perception better.

Tempo Estimation

In the part "Overall Solutions" of this disclosure, some periodicity estimating techniques are introduced, and they can be applied on the accent sequence obtained by the accent identifier 200 to obtain a variable tempo sequence.

Figure 9:
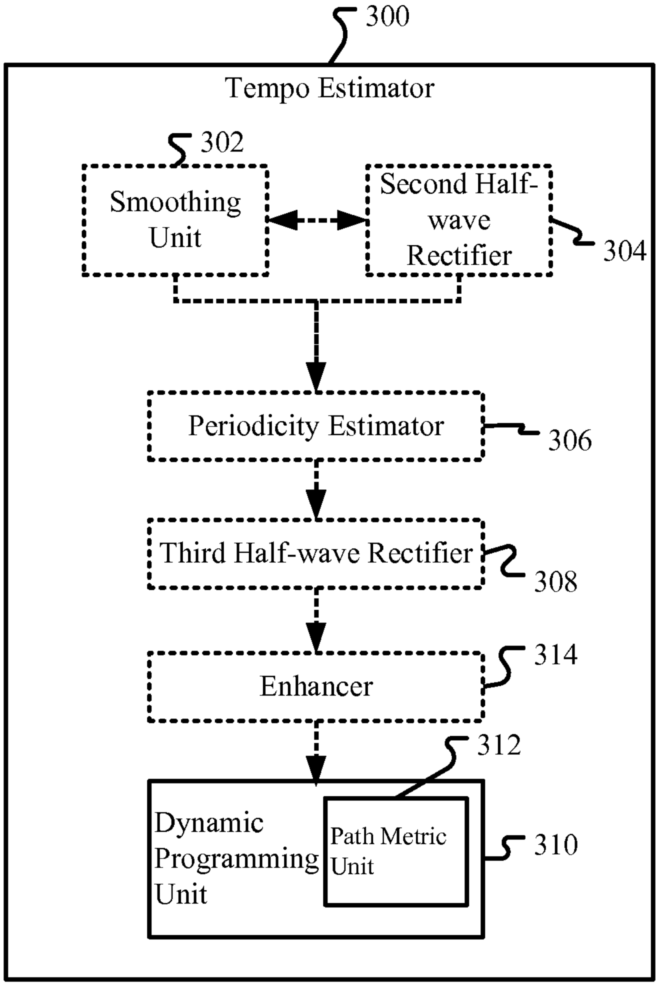
FIG. 9 illustrates embodiments and variants relating to the tempo estimator in the embodiments of the audio processing apparatus.

In this part, as a fourth embodiment of the audio processing apparatus, a novel tempo estimator is proposed to be used in the audio processing apparatus, as shown in FIG. 9, comprising a dynamic programming unit 310 taking the accent sequence as input and outputting an optimal estimated tempo sequence by minimizing a path metric of a path consisting of a predetermined number of candidate tempo values along time line.

A known example of the dynamic programming unit 310 is Viterbi decoder, but the present application is not limited thereto, and any other dynamic programming techniques may be adopted. Simply speaking, dynamic programming techniques are used to predict a sequence of values (usually a temporal sequence of values) through collectively considering a predetermined length of history and/or future of the sequence with respect to the present time point, the length of history or future or the length of the history plus future may be called "path depth". For all the time points within the path depth, various candidate values for each time point constitute different "paths", for each possible path, a path metric may be calculated and a path with the optimal path metric may be selected and thus all the values of the time points within the path depth are determined The input of the dynamic programming unit 310 may be the accent sequence obtained by the accent identifier 200, let it be Y(t), where t is temporally sequential number (index) of each audio frame (now the accent probability score corresponding to the audio frame). In a variant, a half-wave rectification may be performed on Y(t) and the resulted half-wave rectified accent sequence may be the input of the dynamic programming unit 310:

$$y(t) = \begin{cases} Y(t) - \overline{Y}(t), & \text{if } Y(t) > \overline{Y}(t), \\ 0, & \text{else.} \end{cases} \tag{11}$$

Where y(t) is the half-wave rectified accent sequence, $\overline{Y}(t)$ is the moving average or history average of Y(t). Accordingly, a second half-wave rectifier 304 may be provided before the dynamic programming unit 310 in the tempo estimator 300. For specific meaning of the half-wave rectification, moving average and history average, reference may be made to equation (9) and relevant description.

In a further variant, the tempo estimator 300 may comprise a smoothing unit 302 for eliminating noisy peaks in the accent sequence Y(t) before the processing of the dynamic programming unit 310 or the processing of the second half-wave rectifier 304. Alternatively, the smoothing unit 302 may operate on the output y(t) of the second half-wave rectifier 304 and output the smoothed sequence to the dynamic programming unit 310.

In yet a further variant, periodicity estimation may be further performed and the dynamic programming unit operates on the resulted sequence of the periodicity estimation.

For estimating the periodicity, the original accent sequence Y(t) or the half-wave rectified accent sequence y(t), both of which may also have been subjected to smoothing operation of the smoothing unit 302, may be split into windows with length L. The longer the window is, the finer resolution for tempo estimation, but the worse tempo variation tracking capability can be achieved. Meanwhile the higher the overlap is, the better the tempo variation tracking is. In one embodiment, we may set the window length L equal to 6 seconds and the overlap equal to 4.5 seconds. The non-overlapped portion of the window corresponds to the step size between windows. And the step size may vary from 1 frame (corresponding to one accent probability score Y(t) or its derivation y(t) or the like) to the window length L (without overlap). Then a window sequence y(m) may be obtained, where m is the sequence number of the windows. Then, any periodicity estimation algorithm, such as those described in the part "Overall Solutions" of this disclosure, may be performed on each window, and for each window a periodicity function γ(1,m) is obtained, the function represents a score of the periodicity corresponding to a specific period (lag) of l. Then, for different values of l and for all the windows within the path depth, an optimal path metric may be selected at least based on the periodicity values, and thus a path of periodicity values is determined. The period l in each window is just the lag corresponding to a specific tempo value:

$$s(m)(BPM) = \frac{1}{l(\min)} \tag{12}$$

where s(m) is the tempo value at window m.

Accordingly, the tempo estimator 300 may comprise a periodicity estimator 306 for estimating periodicity values of the accent sequence within a moving window and with respect to different candidate tempo values (lag or period), and the dynamic programming unit 310 may comprise a path metric unit 312 for calculating the path metric based on the periodicity values with respect to different candidate tempo values, wherein a tempo value is estimated for each step of the moving window, the size of the moving window depends on intended precision of the estimated tempo value, and the step size of the moving window depends on intended sensibility with respect to tempo variation.

In a variant, the tempo estimator 300 may further comprises a third half-wave rectifier 308 after the periodicity estimator 306 and before the dynamic programming unit 310, for rectifying the periodicity values with respect to a moving average value or history average value thereof before the dynamic programming processing. The third-wave rectifier 308 is similar to the first and second half-rectifiers, and detailed description thereof is omitted.

The path metric unit 312 can calculate the path metric through any existing techniques. In the present application, a further implementation is proposed to derive the path metric from at least one of the following probabilities for each candidate tempo value in each candidate tempo sequence (that is candidate path): a conditional probability $p_{emi}(\gamma(l,m)|s(m))$ of a periodicity value given a specific candidate tempo value, a prior probability $p_{prior}(s(m))$ of a specific tempo value, and a probability $p_t(s(m+1)|s(m))$ of transition from one specific tempo value to another specific tempo value in a tempo sequence. In a specific implementation using all the three probabilities, the path metric may be calculated as, for example:

$$p(S,\gamma)=p_{prior}(s(0))\cdot p_{emi}(\gamma(l,M)|s(M))\cdot\Pi_{0,M-1}(p_t(s(m+1)|s(m))\cdot p_{emi}(\gamma(l,m)|s(m)) \tag{13}$$

Where p(S,γ) is path metric function of a candidate path S with respect to a periodicity value sequence γ(l,m), the path depth is M, that is, S=s(m)=(s(0), s(1), . . . s(M)), m=0, 1, 2 . . . M, $p_{prior}(s(0))$ is the prior probability of a candidate tempo value of the first moving window, $p_{emi}(\gamma(l,M)|s(M))$ is the conditional probability of a specific periodicity value γ(l,m) for window m=M given that the window is in the tempo state s(M).

For different values of s(m) of each moving window m in the path, corresponding for different period/lag values l, there are different path metrics p(S,γ). The final tempo sequence is the path making the path metric p(S,γ) optimal:

$$\hat{S}=\mathrm{argmax}_S(p(S,\gamma)) \tag{14}$$

Then a tempo path or tempo sequence $\hat{S}$=s(m) is obtained. It may be converted into a tempo sequence s(t). If the step size of the moving window is 1 frame, then s(m) is directly s(t), that is, m=t. If the step size of the moving window is more than 1 frame, such as w frames, then in s(t), every w frames have the same tempo value.

Accordingly, the path metric unit 312 may comprise one of a first probability calculator 2042, a second probability calculator 2044 and a third probability calculator 2046, respectively for calculating the three probabilities $p_{emi}(\gamma(l,m)|s(m))$, $p_{prior}(s(m))$ and $p_t(s(m+1)|s(m))$.

The conditional probability $p_{emi}(\gamma(l,m)|s(m))$ is the probability of a specific periodicity value γ(l,m) for a specific lag l for window m given that the window is in the tempo state s(m) (a tempo value, corresponding to a specific lag or inter-beat duration l). l is related to s(m) and can be obtained from equation (12). In other words, the conditional probability $p_{emi}(\gamma(l,m)|s(m))$ is equivalent to a conditional probability $p_{emi}(\gamma(l,m)|l)$ of the specific periodicity value γ(l,m) for moving window m given a specific lag or inter-beat duration l. This probability may be estimated based on the periodicity value with regard to the specific candidate tempo value l in moving window m and the periodicity values for all possible candidate tempo values l within the moving window m, for example:

$$p_{emi}(\gamma(l,m)|s(m))=p_{emi}(\gamma(l,m)|l)=\gamma(l,m)/\Sigma_l\gamma(l,m) \tag{15}$$

For example, for a specific lag $l=L_0$, that is a specific tempo value $s(m)=T_0=1/L_0$, we have:

$$p_{emi}(\gamma(l,m)|s(m))=p_{emi}(\gamma(L_0,m)|T_0)=p_{emi}(\gamma(L_0,m)|L_0)=\gamma(L_0,m)/\Sigma_l\gamma(l,m) \tag{15-1}$$

However, for the path metric p(S,γ) in equation (13), every possible value of l for each moving window m shall be tried so as to find the optimal path. That is, in equation (15-1) the specific lag $L_0$ shall vary within the possible range l for each moving window m. That is, equation (15) shall be used for the purpose of equation (13)

The prior probability $p_{prior}(s(m))$ is the probability of a specific tempo state s(m) itself. In music, different tempo values may have a general distribution. For example, generally the tempo value will range from 30 to 500 bpm (beats per minute), then tempo values less than 30 bpm and greater than 500 bpm may have a probability of zero. For other tempo values, each may have a probability value corresponding to the general distribution. Such probability values may be obtained beforehand through statistics or may be calculated with a distribution model such as a Gaussian model.

We know there are different music genres, styles or other metadata relating to audio types. For different types of audio signals, the tempo values may have different distributions. Therefore, in a variant, the second probability calculator 2044 may be configured to calculate the probability of a specific tempo value in a specific moving window based on the probabilities of possible metadata values corresponding to the specific moving window and conditional probability of the specific tempo value given each possible metadata value of the specific moving window, for example:

$$p_{prior}(s(m))=\Sigma_g p_{prior}(s(m)|g)\cdot p(g) \quad (16)$$

Where $p_{prior}(s(m)|g)$ is conditional probability of s(m) given a metadata value g, and p(g) is the probability of metadata value g.

That is, if the audio signal in the moving window has certain metadata value, then each candidate tempo value in the moving window has its probability corresponding to the metadata value. When the moving window corresponds to multiple possible metadata values, then the probability of each candidate tempo value in the moving window shall be a weighted sum of the probabilities for all possible metadata values. The weights may be, for example, the probabilities of respective metadata values.

Supposing the tempo range of each metadata value g is modeled as a Gaussian function $N(\mu_g, \sigma_g)$, where $\mu_g$ is mean and $\sigma_g$ is variance, the prior probability of a specific tempo can be predicted as below:

$$p_{prior}(s(m))=\Sigma_g N(\mu_g,\sigma_g)\cdot p(g) \quad (17)$$

Figure 10:
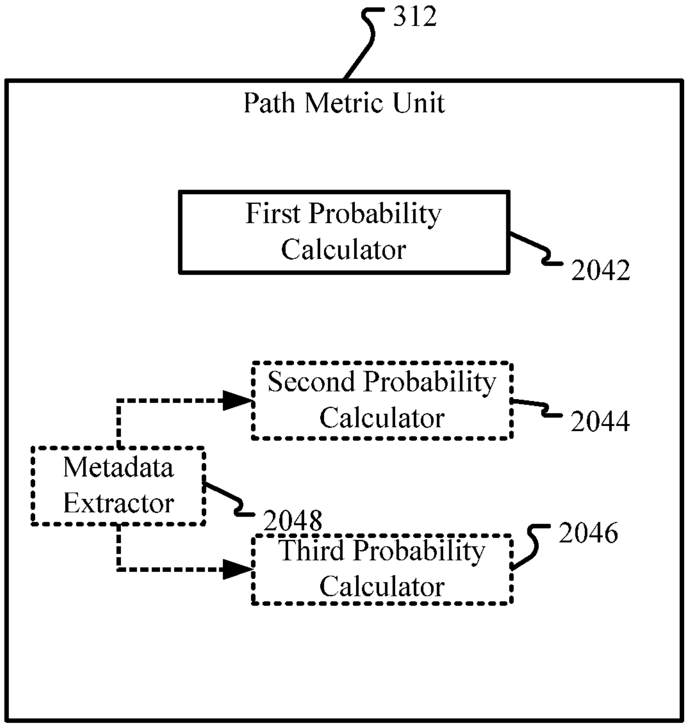
FIG. 10 illustrates variants relating to the path metric unit in the embodiments of the audio processing apparatus.

The metadata information (metadata value and its probability) may have been encoded in the audio signal and may be retrieved using existing techniques, or may be extracted with a metadata extractor 2048 (FIG. 10) from the audio segment corresponding to concerned moving window. For example, the metadata extractor 2048 may be an audio type classifier for classifying the audio segment into different audio types g with corresponding probabilities estimation p(g).

The probability $p_t(s(m+1)|s(m))$ is a conditional probability of a tempo state s(m+1) given the tempo state of the previous moving window is s(m), or the probability of transition from a specific tempo value for a moving window to a specific tempo value for the next moving window.

Similar to the probability $p_{prior}(s(m))$, in music, different tempo value transition pairs may have a general distribution, and each pair may have a probability value corresponding to the general distribution. Such probability values may be obtained beforehand through statistics or may be calculated with a distribution model such as a Gaussian model. And similarly, for different metadata values (such as audio types) of audio signals, the tempo value transition pairs may have different distributions. Therefore, in a variant, the third probability calculator 2046 may be configured to calculate the probability of transition from a specific tempo value for a moving window to a specific tempo value for the next moving window based on the probabilities of possible metadata values corresponding to the moving window or the next moving window and the probability of the specific tempo value for the moving window transiting to the specific tempo value for the next moving window for each of the possible metadata values, for example:

$$p_t(s(m+1)|s(m)=\Sigma_g p_t(s(m+1),s(m)|g)\cdot p(g) \quad (18)$$

Where $p_t(s(m+1), s(m)|g)$ is conditional probability of a consecutive tempo value pair s(m+1) and s(m) given a metadata value g, and p(g) is the probability of metadata value g. Similar to the second probability calculator 2044, g and p(g) may have been encoded in the audio signal and may be simply retrieved, or may be extracted by the metadata extractor 2048, such as an audio classifier.

In a variant, the tempo transition probability $p_t(s(m+1), s(m)|g)$ may be modeled as a Gaussian function $N(0, \sigma_g')$ for each metadata value g, where $\sigma_g'$ is variance, and the mean is equal to zero as we favour tempo continuity over time. Then the transition probability can be predicted as below:

$$p_t(s(m+1)|s(m))=\Sigma_g N(0,\sigma_g')\cdot p(g) \quad (19)$$

As mentioned before, the periodicity estimation algorithm may be implemented with autocorrelation function (ACF). Therefore, as an example, the periodicity estimator 306 may comprise an autocorrelation function (ACF) calculator for calculating autocorrelation values of the accent probability scores within a moving window, as the periodicity values. The autocorrelation values may be further normalized with the size of the moving window L and the candidate tempo value (corresponding to the lag l), for example:

$$\gamma(l, m) = \frac{1}{L-l}\sum_{n=0}^{L-l-1} y(n+m)y(n+l+m) \quad (20)$$

In a variant, the tempo estimator 300 may further comprise an enhancer 314 (FIG. 9) for enhancing the autocorrelation values for a specific candidate tempo value with autocorrelation values under a lag being an integer number times of the lag l corresponding to the specific candidate tempo value. For example, a lag l may be enhanced with its double, triple and quadruple, as given in the equation below:

$$\mathcal{R}(l, m) = \sum_{a=1}^{4}\sum_{b=1-a}^{a-1} \gamma(a\cdot l+b, m)\cdot\frac{1}{2\cdot a-1} \quad (21)$$

Where, if the lag l is to be enhanced only with its double and triple, then α may ranges from 1 to 3, and so on.

With the enhanced autocorrelation value sequence $\mathcal{R}$(l, m), equations (13), (14) and (15) may be rewritten as:

$$p(S,R)=p_{prior}(s(0))\cdot p_{emi}(\mathcal{R}(l,M)|s(M))\cdot\Pi_{0,M-1}(p_t(s(m+1)|s(m))\cdot p_{emi}(\mathcal{R}(l,m)|s(m))) \quad (13')$$

$$\hat{S}=\mathrm{argmax}_S(p(S,R)) \quad (14')$$

$$p_{emi}(\mathcal{R}(l,m)|s(m))=\mathcal{R}(l,m)\Sigma_l\mathcal{R}(l,m) \quad (15')$$

Beat Tracking

In the part "Overall Solutions" of this disclosure, some beat tracking techniques are introduced, and they can be applied on the tempo sequence obtained by the tempo estimator 300 to obtain a beat sequence.

Figure 11:
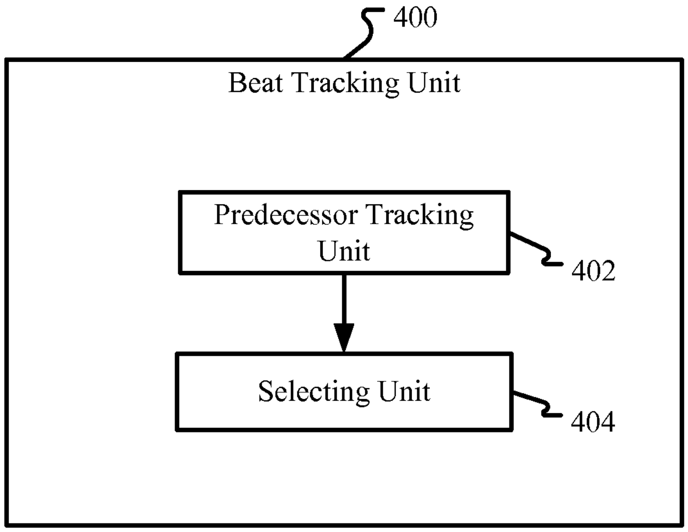
FIG. 11 illustrate an embodiment relating to the beat tracking unit in the embodiments of the audio processing apparatus.

In this part, as a fifth embodiment of the audio processing apparatus, a novel beat tracking unit 400 is proposed to be used in the audio processing apparatus, as shown in FIG. 11, comprising a predecessor tracking unit 402 for, for each anchor position in a first direction of the section of the accent sequence, tracking the previous candidate beat position in a second direction of the section of the accent sequence, to update a score of the anchor position based on the score of the previous candidate beat position; and a selecting unit 404 for selecting the position with the highest score as a beat position serving as a seed, based on which the other beat positions in the section are tracked iteratively based on the tempo sequence in both forward direction and backward direction of the section. Here, the first direction may be the forward direction or the backward direction; and correspondingly the second direction may be the backward direction or the forward direction.

Figure 12:
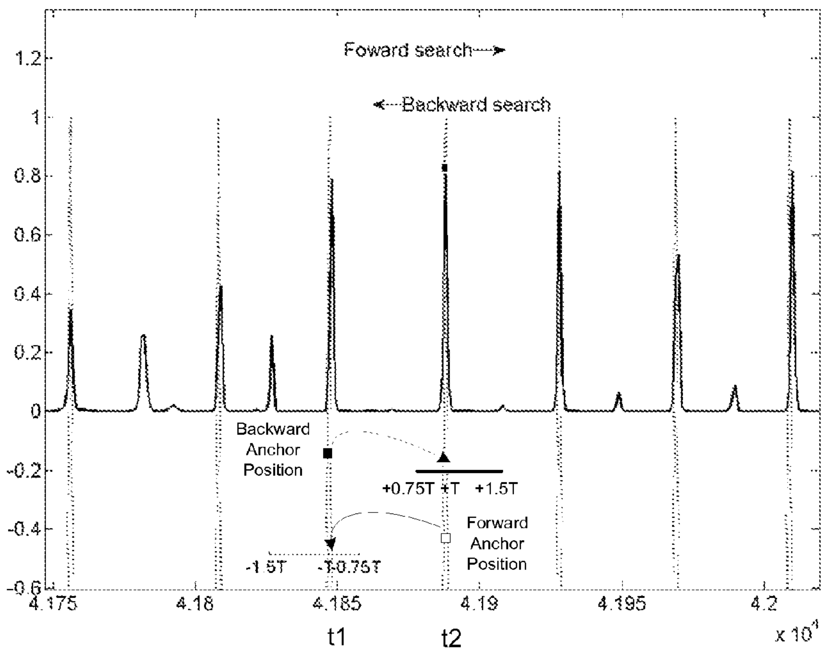
FIG. 12 is a diagram illustrating the operation of the predecessor tracking unit in embodiments of the audio processing apparatus.

Specifically, as illustrated in FIG. 12 (the abscissa axis is frame index number, the vertical axis is probability score in the accent sequence), the waves in solid line indicate the accent sequence y(t) (Y(t) may also be used, as stated before), the waves in dotted line indicate the ground-truth beat positions to be identified. The predecessor tracking unit 402 may be configured to operate from the left to the right in FIG. 12 (forward scanning), or from the right to the left(backward scanning), or in both directions as described below. Take the direction from the left to the right as an example, the predecessor tracking unit 402 will sequentially take each position in the accent sequence y(t) as an anchor position (Forward Anchor Position in FIG. 12), and track a candidate beat position immediately previous to the anchor position (as shown by the curved solid arrow line), and accordingly update the score of the anchor position. For example, as shown in FIG. 12, when position $t=t_1$ is taken as the anchor position, its score will be updated as score($t_1$); when frame $t=t_2$ is taken as the anchor position, its score will be updated as score($t_2$). In addition, when frame $t=t_2$ is taken as the anchor position, previous frames including the frame $t=t_1$ will be searched for the previous candidate beat position. During the search, score($t_1$) (as well as other previous frames' scores) will be updated again. Here, "update" means the old score to be updated will change to a new score determined based on, among others, the old score, and the initial score of a position may be determined based on accent probability score of the position in the accent sequence, for example, the initial score may be just the accent probability score:

$$\mathrm{score}_{ini}(t)=y(t) \tag{22}$$

And for an anchor position, for example, its updated score may be a sum of its old score and the score of the previous candidate beat position:

$$\mathrm{score}_{upd}(t)=\mathrm{score}(t-P)+\mathrm{score}_{old}(t) \tag{23}$$

Where $\mathrm{score}_{upd}(t)$ is the updated score of the anchor position t, score(t−P) is the score of the previous candidate beat position searched out from the anchor position t, assuming that the previous candidate beat position is P frames earlier than the anchor position t, and $\mathrm{score}_{old}(t)$ is the old score of the anchor position t, that is its score before the updating. If it is the first time of updating for the anchor position, then $$\mathrm{score}_{old}(t)=\mathrm{score}_{ini}(t) \tag{24}$$

The selection unit 404 uses the finally updated score.

In the embodiment described above, the accent sequence is scanned from the left to the right in FIG. 12 (forward scanning). In a variant, the accent sequence may be scanned from the right to the left in FIG. 12 (backward scanning). Similarly, the predecessor tracking unit 402 will sequentially take each position in the accent sequence y(t) as an anchor position (backward anchor position as shown in FIG. 12), but in a direction of the right to the left, and track a candidate beat position immediately previous (with respect to the direction from the right to the left) to the anchor position (as shown by the curved dashed arrow line in FIG. 12), and accordingly update the score of the anchor position. For example, as shown in FIG. 12, when position $t=t_2$ is taken as the anchor position, its score will be updated as score($t_2$); after that, frame $t=t_1$ is taken as the anchor position, its score will be updated as score($t_1$). In addition, when frame $t=t_1$ is taken as the anchor position, previous frames including the frame $t=t_2$ will be searched for the previous beat position. During the search, score($t_2$) (as well as other previous frames' scores) will be updated again. Note that in both scanning directions, the initial score may be the accent probability score. If the scores in the inverse direction are attached with an apostrophe, then equation (23) to (24) may be rewritten as:

$$\mathrm{score}'_{upd}(t)=\mathrm{score}'(t+P')+\mathrm{score}'_{old}(t) \tag{23'}$$

If it is the first time of updating for the anchor position, then $$\mathrm{score}'_{old}(t)=\mathrm{score}_{ini}(t) \tag{24'}$$

Where score'(t+P') is the score of the previous (with respect to the direction from the right to the left) candidate beat position searched out from the anchor position t. In the scanning direction from the right to the left, the previous candidate beat position is searched; but if still viewed in the natural direction of the audio signal, that is in the direction from the left to the right, then it's the succedent candidate beat position to be searched. That is, the frame index of the searched candidate beat position is greater than the anchor frame index t, assuming the difference is P' frames. That is, in FIG. 12, in the embodiment of scanning from the left to the right, candidate beat position $t_1$ may be searched when position $t_2$ is taken as the anchor position, $t_1=t_2-P$; then in the variant of scanning from the right to the left, candidate beat position $t_2$ may be searched when position $t_1$ is taken as the anchor position, $t_2=t_1+P'$. Of course, for the same $t_1$ and $t_2$, P=P'. The selection unit 404 uses the finally updated score.

In a further variant where the scanning is performed in both directions, then for each position, a combined score may be obtained based on the finally updated scores in both directions. The combination may be of any manner such as addition or multiplication. For example:

$$\mathrm{score}_{com}(t)=\mathrm{score}_{upd}(t)*\mathrm{score}'_{upd}(t) \tag{25}$$

The selection unit 404 uses the combined score.

After the beat position seed has been determined by the selection unit 404, the other beat positions may be deduced from the beat position seed according to the tempo sequence with any existing techniques as mentioned in the part "Overall Solutions" in the present disclosure. As a variant, the other beat positions may be tracked iteratively with the predecessor tracking unit 402 in forward direction and/or backward direction. In a further variant, before selecting the beat position seed, for each anchor position a previous candidate beat position has been found and may be stored, then after the beat position seed has been selected, the other beat positions may be tracked using the stored information. That is, pairs of "anchor position" and corresponding "previous candidate beat position" are stored. Take the situation where only scanning in forward direction is performed as an example, that is, only $\mathrm{score}_{upd}(t)$ has been obtained. Then in backward direction, a previous beat position may be tracked through using the beat position seed as anchor position and finding the corresponding previous candidate beat position as the previous beat position, then a further previous beat position may be tracked using the tracked previous beat position as new anchor position, and so on until the start of the accent sequence. And in forward direction, a subsequent beat position may be tracked through regarding the beat position seed as a "previous candidate beat position" and finding the corresponding anchor position as the subsequent beat position, then a further subsequent beat position may be tracked using the tracked subsequent beat position as a new "previous candidate beat position", and so on until the end of the accent sequence.

When searching the previous candidate beat position based on the anchor position, the predecessor tracking unit 402 may be configured to track the previous candidate beat position by searching a searching range determined based on the tempo value at the corresponding position in the tempo sequence.

As shown in FIG. 12, when scanning the accent sequence from the left to the right (forward scanning), the predecessor tracking unit 402 will search a range located around T before the anchor position, where T is the period value according to the estimated tempo corresponding to the anchor position, and in the example shown in FIG. 12, $T=t_2-t_1$. For example, the searching range p (which is the value range of P) may be set as following:

$$p=(\mathcal{R}(0.75T),\mathcal{R}(0.75T)+1,\ \ldots\ ,\mathcal{R}(1.5T)) \tag{26}$$

where $\mathcal{R}(\bullet)$ denotes the rounding function.

As stated before, the predecessor tracking unit 402 may adopt any existing techniques. In the present application it is proposed a new solution adopting a cost function highlighting the preliminarily estimated beat period deduced from the corresponding tempo value. For example, we may apply a log-time Gaussian function (but not limited thereto) to the searching range p. In the example shown in FIG. 12, for anchor position $t_2$, the searching range is equivalent to $[t_2-\mathcal{R}(1.5T),\ t_2-\mathcal{R}(0.75T)]$ in the dimension of t.

In an implementation, the log-time Gaussian function is used over the searching range p as a weighting window to approximate the transition probability txcost from the anchor position to the previous candidate beat position (Note that the maximum of the log-time Gaussian window is located at T from the anchor position):

$$txcost(t-p) = -\left(\log\left(\frac{p}{T}\right)\right)^2 \tag{27}$$

Search over all possible previous candidate beat positions (predecessors) t−p in the searching range p, and update their scores with the transition probability:

$$\text{score}_{upd}(t-p)=\alpha\cdot txcost(t-p)+\text{score}_{old}(t-p) \tag{28}$$

where α is the weight applied to the transition cost, could be from 0 to 1, and its typical value could be 0.7. Here, $\text{score}_{old}(t-p)$ may have been updated once when the position t−p is used as an anchor position as described before, and in equation (28) it is updated again. The selecting unit 404 uses the finally updated score of each position.

Based on $\text{score}_{upd}(t-p)$, the best previous candidate beat location t−P with the highest score is found:

$$t-P=t-\text{argmax}_p(\text{score}_{upd}(t-p)) \tag{29}$$

And see equation (23), the score of the present anchor position may be updated based on the updated score of the position t−P, that is score(t−P). Optionally, the position t−P may be stored as the previous candidate beat position with respect to the anchor position t, and may be used in the subsequent steps.

In brief, the predecessor tracking unit 402 may be configured to update the score of each position in the searching range based on a transition cost calculated based on the position and the corresponding tempo value, to select the position having the highest score in the searching range as the previous candidate beat position, and to update the score of the anchor position based on the highest score in the searching range.

Still as shown in FIG. 12, when scanning the accent sequence from the right to the left (backward scanning), the predecessor tracking unit 402 will search a range located around T before the anchor position in the direction from the right to the left, or after the anchor position in the direction from the left to the right, where T is the period value according to the estimated tempo corresponding to the anchor position, and in the example shown in FIG. 12, $T=t_2-t_1$. For example, the searching range p' (which is the value range of P') may be set as following:

$$p'=(\mathcal{R}(0.75T),\mathcal{R}(0.75T)+1,\ \ldots\ ,\mathcal{R}(1.5T)) \tag{26'}$$

where $\mathcal{R}(\bullet)$ denotes the rounding function.

As an example, for anchor position $t_1$, the searching range is equivalent to $[t_1+\mathcal{R}(0.75T),\ t_1+\mathcal{R}(1.5T)]$ in the dimension of t. Similar to equation (23') to (24'), when anchor position scans from the right to the left, for the processing of the predecessor tracking unit, equations (27) to (29) may be rewritten as follows, with apostrophe added:

$$txcost'(t+p') = -\left(\log\left(\frac{p'}{T}\right)\right)^2 \tag{27'}$$

$$\text{score}'_{upd}(t+p') = \alpha\cdot txcost'(t+p') + \text{score}'_{old}(t+p') \tag{28'}$$

$$t+P' = t-\text{argmax}_{p'}(\text{score}'_{upd}(t+p')) \tag{29'}$$

And see equation (23'), the score of the present anchor position may be updated based on the updated score of the position t+P', that is score'(t+P'). Optionally, the position t+P' may be stored as the previous candidate beat position with respect to the anchor position t, and may be used in the subsequent steps.

As stated before, the selecting unit 404 selects the highest score among the finally updated scores of all the positions in the accent sequence, the corresponding position being used as the seed of beat position. The finally updated scores may be obtained by the predecessor tracking unit scanning the accent sequence in either forward or backward direction. The selecting unit may also selects the highest score among the combined scores obtained from the finally updated scores obtained in both forward and backward directions.

After that, the other beat positions may be tracked iteratively with the predecessor tracking unit 402 in forward direction and/or backward direction using the similar techniques discussed above, without necessity of updating the scores. In a further variant, when searching the previous candidate beat position (predecessor) from each anchor position, the previous candidate beat position has been found and may be stored, then after the beat position seed has been selected, the other beat positions may be tracked using the stored information. For example, from the beat position seed $P_0$, we may take it as anchor position and get two adjacent beat positions using the stored previous candidate beat positions $P_1$ and $P'_1$ in both forward and backward directions. Then using $P_1$ and $P'_1$ respectively as anchor positions, we may further get two adjacent beat positions $P_2$ and $P'_2$ based on the stored previous candidate beat posi tions, and so on until the two ends of the accent sequence. Then we get a sequence of beat positions:

$$P_x, P_{x-1}, \ldots P_2, P_1, P_0, P'_1, P'_2, \ldots P'_{y-1}, P'_y \quad (30)$$

Where x and y are integers.

Combination of Embodiments and Application Scenarios

All the embodiments and variants thereof discussed above may be implemented in any combination thereof, and any components mentioned in different parts/embodiments but having the same or similar functions may be implemented as the same or separate components.

For example, the embodiments and variants shown in FIGS. 1, 2 and 7-11 may be implemented in any combination thereof. Specifically, each different implementation of the accent identifier 200 may be combined with each different implementation of the tempo estimator 300. And resulted combinations may be further combined with each different implementation of the beat tracking unit 400. In the accent identifier 200, the first feature extractor 202, the second feature extractor 204 and other additional feature extractors may be combined with each other in any possible combinations, and the subset selector 208 is optional in any situation. Further, in the first feature extractor 202 and the second feature extractor 204, the normalizing unit 2022, the first half-wave rectifier 2042, the addition unit 2044 and the low-pass filter 2046 are all optional and may be combined with each other in any possible combinations (including different sequences). The same rules are applicable to the specific components of the tempo estimator 300 and the path metric unit 312. In addition, the first, second and third half-wave rectifier may be realized as different components or the same component.

Figure 13:
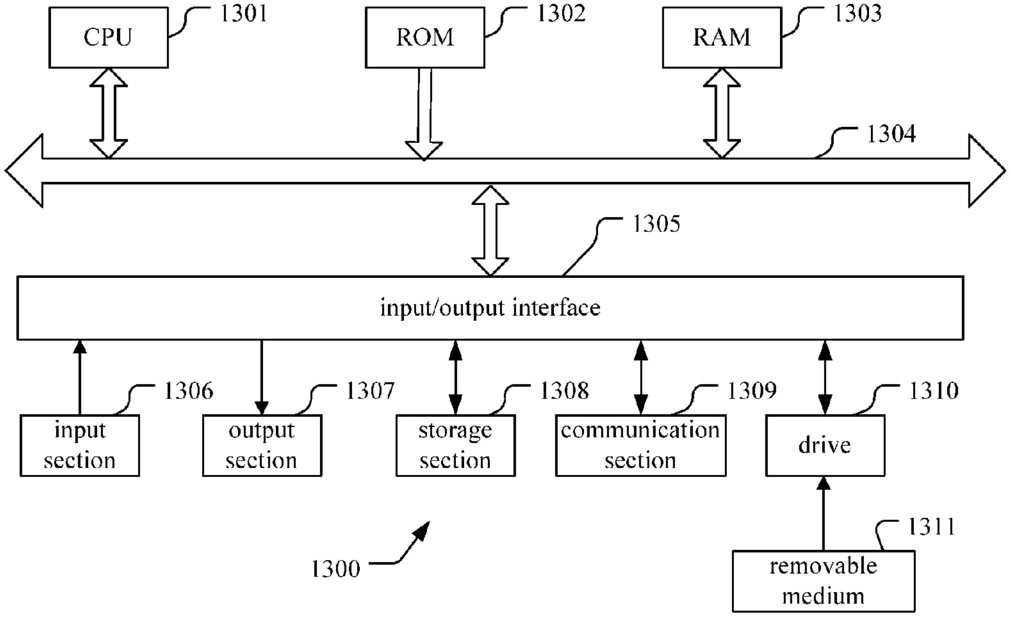
FIG. 13 is a block diagram illustrating an exemplary system for implementing the aspects of the present application.

As discussed at the beginning of the Detailed Description of the present application, the embodiment of the application may be embodied either in hardware or in software, or in both. FIG. 13 is a block diagram illustrating an exemplary system for implementing the aspects of the present application.

In FIG. 13, a central processing unit (CPU) 1301 performs various processes in accordance with a program stored in a read only memory (ROM) 1302 or a program loaded from a storage section 1308 to a random access memory (RAM) 1303. In the RAM 1303, data required when the CPU 1301 performs the various processes or the like are also stored as required.

The CPU 1301, the ROM 1302 and the RAM 1303 are connected to one another via a bus 1304. An input/output interface 1305 is also connected to the bus 1304.

The following components are connected to the input/output interface 1305: an input section 1306 including a keyboard, a mouse, or the like; an output section 1307 including a display such as a cathode ray tube (CRT), a liquid crystal display (LCD), or the like, and a loudspeaker or the like; the storage section 1308 including a hard disk or the like; and a communication section 1309 including a network interface card such as a LAN card, a modem, or the like. The communication section 1309 performs a communication process via the network such as the internet.

A drive 1310 is also connected to the input/output interface 1305 as required. A removable medium 1311, such as a magnetic disk, an optical disk, a magneto-optical disk, a semiconductor memory, or the like, is mounted on the drive 1310 as required, so that a computer program read there from is installed into the storage section 1308 as required.

In the case where the above-described components are implemented by the software, the program that constitutes the software is installed from the network such as the internet or the storage medium such as the removable medium 1311.

In addition to general-purpose computing apparatus, the embodiments of the present application may also be implemented in a special-purpose computing device, which may be a part of any kind of audio processing apparatus or any kind of voice communication terminal.

The present application may be applied in many areas. The rhythmic information in multiple levels is not only essential for the computational modeling of music understanding and music information retrieval (MIR) applications, but also useful for audio processing applications. For example, once the musical beats are estimated, we can use them as the temporal unit for high-level beat-based computation instead of low-level frame-based computation that cannot tell much about music. Beat and bar detection can be used to align the other low-level features to represent perceptually salient information, so the low-level features are grouped by musically meaningful content. This has recently been proven to be exceptionally useful for mid-specificity MIR tasks such as cover song identification.

In audio signal post-processing realm, one exemplary application is using tempo estimation to optimize the release time for the compression control of an audio signal. For music with a slow tempo, the audio compression processing is suitable to be applied with long release time to ensure the sound integrity and enrichment, whereas for music with a fast tempo and salient rhythmic beats, the audio compression processing is suitable to be applied with short release time to secure the sound to be not sounding obscure.

Rhythm is one of the most fundamental and crucial characteristic of audio signals. Automatic estimation of music rhythm can potentially be utilized as a fundamental module in a wide range of applications, such as audio structure segmentation, content-based querying and retrieval, automatic classification, music structure analysis, music recommendation, playlist generation, audio to video (or image) synchronization, etc. Related applications have gained a place in software and web services aiming at recording producers, musicians and mobile application developers, as well as in widely-distributed commercial hardware mixers for DJs.

Audio Processing Methods

In the process of describing the audio processing apparatus in the embodiments hereinbefore, apparently disclosed are also some processes or methods. Hereinafter a summary of these methods is given without repeating some of the details already discussed hereinbefore, but it shall be noted that although the methods are disclosed in the process of describing the audio processing apparatus, the methods do not necessarily adopt those components as described or are not necessarily executed by those components. For example, the embodiments of the audio processing apparatus may be realized partially or completely with hardware and/or firmware, while it is possible that the audio processing method discussed below may be realized totally by a computer-executable program, although the methods may also adopt the hardware and/or firmware of the audio processing apparatus.

The methods will be described below with reference to FIGS. 14-20.

Figure 14:
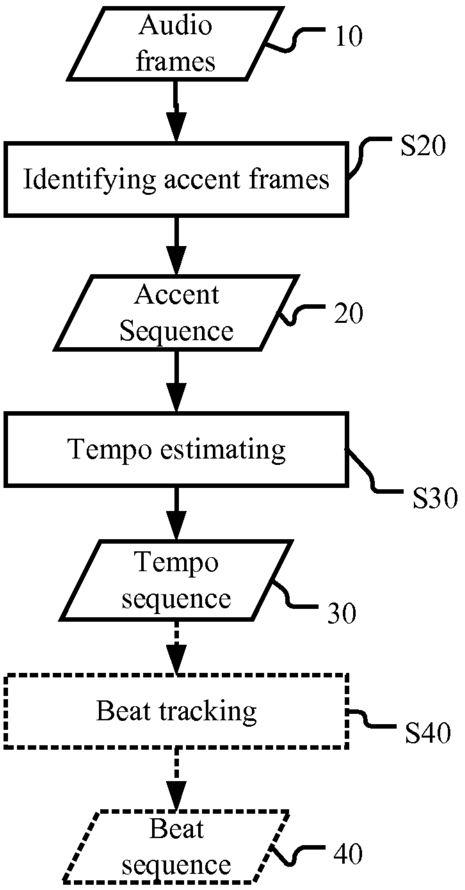
FIG. 14 is a flowchart illustrating embodiments of the audio processing method according to the present application.

As shown in FIG. 14, an embodiment of the audio processing method comprises identifying (operation S20) accent frames from a plurality of audio frames 10, resulting in an accent sequence 20 comprised of probability scores of accent and/or non-accent decisions with respect to the plurality of audio frames; and estimating (operation S30) a tempo sequence 30 of the plurality of audio frames based on the accent sequence 20. The plurality of audio frames 10 may be partially overlapped with each other, or may be adjacent to each other without overlapping.

Further, based on the tempo sequence 30, a sequence of beat positions 40 in a section of the accent sequence may be estimated (operation S40).

The operation of identifying the accent frames may be realized with various classifying algorithms as discussed before, especially with a Bidirectional Long Short Term Memory (BLSTM), the advantage of which has been discussed.

Figure 15:
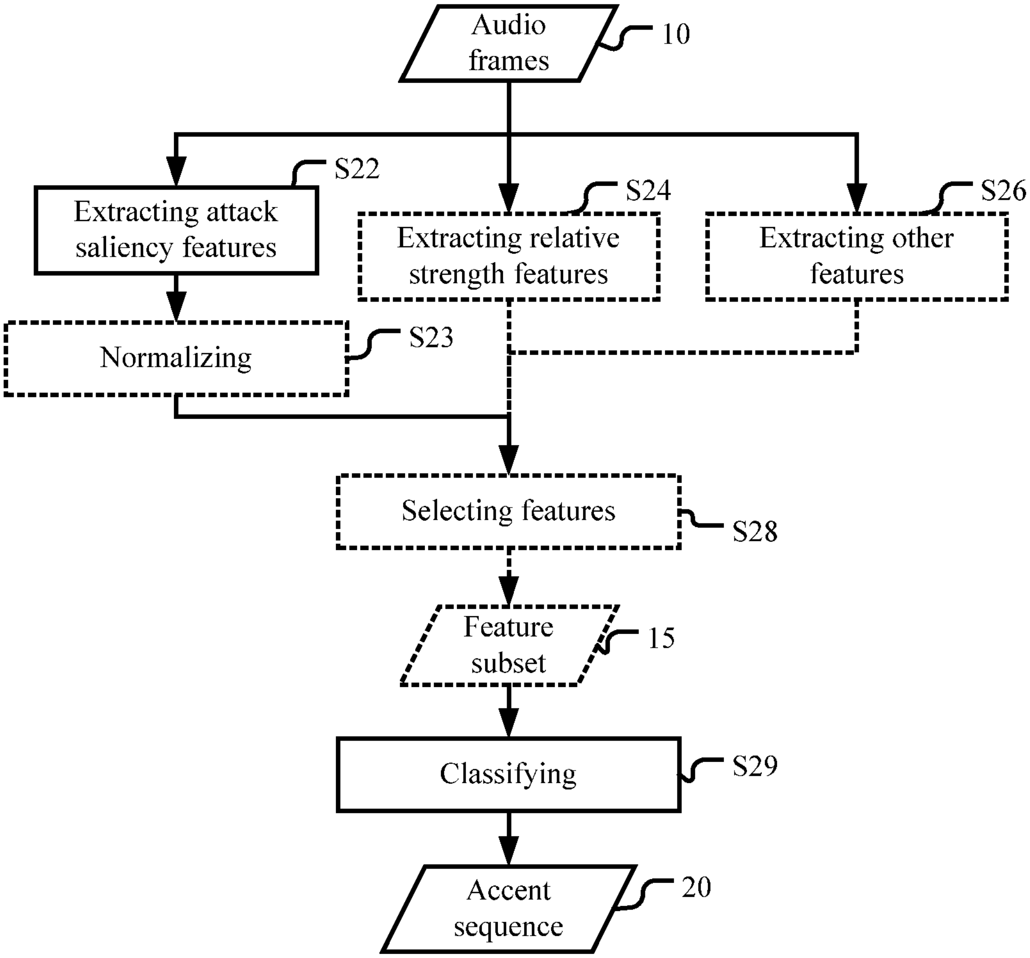
FIG. 15 is a flowchart illustrating implementations of the operation of identifying accent frames in the audio processing method according to the present application.

For classifying the accent frames, various features may be extracted. In the present application, some new features are proposed, including attack saliency features and relative strength features. These features may be used together with other features by any classifier to classify the audio frames 10 (operation S29). In different embodiments as shown in FIG. 15, the operation of identifying the accent frames may include any one of or any combination of the following operations: extracting (operation S22) from each audio frame at least one attack saliency feature representing the proportion that at least one elementary attack sound component takes in the audio frame; extracting (operation S24) from each audio frame at least one relative strength feature representing change of strength of the audio frame with respect to at least one adjacent audio frame; and extracting (operation S26) from each audio frame other features. Correspondingly, the classifying operation the plurality of audio frames (operation S29) may be based on at least one of the at least one attack saliency feature and/or the at least one relative strength feature and/or at least one additional feature. The at least one additional feature may comprise at least one of timbre-related features, energy-related features and melody-related features. Specifically, the at least one additional feature may comprise at least one of Mel-frequency Cepstral Coefficients (MFCC), spectral centroid, spectral roll-off, spectrum fluctuation, Mel energy distribution, Chroma and bass Chroma.

In a variant, the identifying operation S20 may further comprises selecting a subset of features from the at least one additional feature (operation S28), the at least one attack saliency feature and/or the at least one relative strength feature, and the classifying operation S29 may be performed based on the subset of features 15.

For extracting the at least one attack saliency feature, a decomposition algorithm may be used, including Non-negative Matrix Factorization (NMF) algorithm, Principle Component Analysis (PCA) or Independent Component Analysis (ICA). Specifically, an audio frame may be decomposed into at least one elementary attack sound component, the mixing factor of the at least one elementary attack sound component may serve, collectively or individually as the basis of the at least one attack saliency feature.

Generally, an audio signal may comprise not only elementary attack sound component, but also elementary non-attack sound component. For decomposing an audio signal more precisely and for adapting the decomposition algorithm to any audio signal, in the present application an audio frame may be decomposed into both at least one elementary attack sound component and at least one elementary non-attack sound component, resulting in a matrix of mixing factors of the at least one elementary attack sound component and the at least one elementary non-attack sound component, collectively or individually as the basis of the at least one attack saliency feature. In a variant, although mixing factors of both elementary attack sound components and elementary non-attach sound components are obtained, only the mixing factors of the elementary attack sound component are used as the basis of the at least one attack saliency feature.

The individual mixing factors or its matrix as a whole may be used as the at least one attack saliency feature. Alternatively, any linear or non-linear combination (such as sum or weighted sum) of some or all of the mixing factors may be envisaged. More complex methods for getting the attack saliency feature based on the mixing factors are also envisageable.

After obtaining the at least one attack saliency feature of each audio frame, the feature may be normalized with the energy of the audio frame (operation S23, FIG. 15). Further, it may be normalized with temporally smoothed energy of the audio frame, such as moving averaged energy or weighted sum of the energy of the present audio frame and history energy of the audio frame sequence.

For decomposing the audio frames, the at least one attack sound component and/or the at least one non-attack sound component must be known beforehand. They may be obtained beforehand with any decomposition algorithm from at least one attack sound source and/or non-attack sound source, or may be derived beforehand from musicology knowledge by manually construction.

Incidentally, the audio frames to be decomposed may be any kind of spectrum (and the elementary attack/non-attack sound components may be of the same kind of spectrum), including Short-time Fourier Transform (STFT) spectrum, Time-Corrected Instantaneous Frequency (TCIF) spectrum, or Complex Quadrature Minor Filter (CQMF) transformed spectrum.

The relative strength feature, representing change of strength of the audio frame with respect to at least one adjacent audio frame, may be a difference or a ratio between a spectrum of the audio frame and that of the at least one adjacent audio frame. As variants, different transformation may be performed on the spectrums of the audio frames. For example, the spectrum (such as STFT, TCIF or CQMF spectrum) may be converted into log-scale spectrum, Mel band spectrum or log-scale Mel band spectrum. For each frame, the difference/ratio may be in the form of a vector comprising differences/ratios in different frequency bins or Mel bands. At least one of these differences/ratios or any linear/non-linear combination of some or all of the differences/ratios may be taken as the at least one relative strength feature. For example, for each audio frame, the differences over at least one Mel band/frequency bin may be summed or weightedly summed, with the sum as a part of the at least one relative strength feature.

In a variant, for each Mel band or each frequency bin, the differences may be further half-wave rectified in the dimension of time (frames). In the half-rectification, the reference may be the moving average value or history average value of the differences for the plurality of audio frames (along the time line). The sum/weighed sum of differences on different frequency bins/Mel bands may be subject to similar processing. Additionally/alternatively, redundant high-frequency components in the differences and/or the sum/weighted sum in the dimension of time may be filtered out, such as by a low-pass filter.

Figure 16:
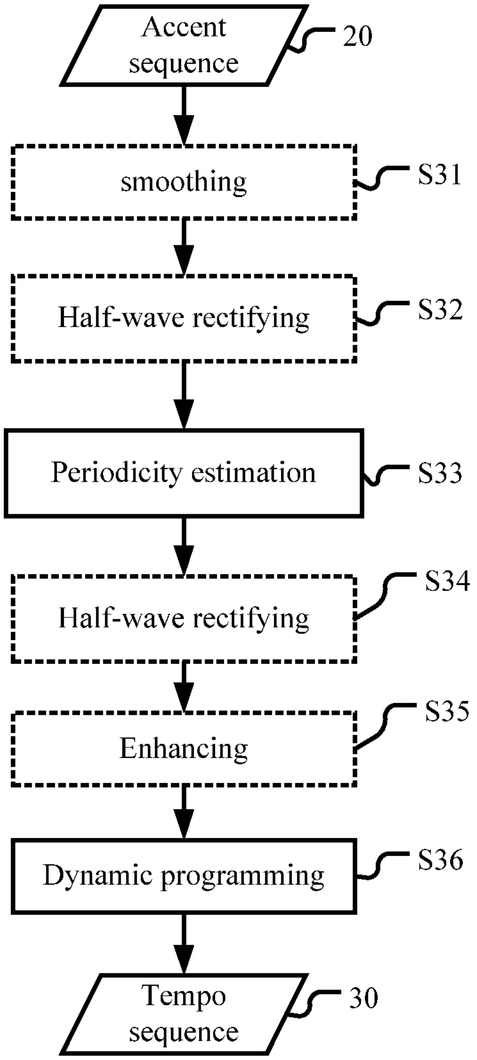
FIG. 16 is a flowchart illustrating implementations of the operation of estimating the tempo sequence based on the accent sequence.
Figure 17:
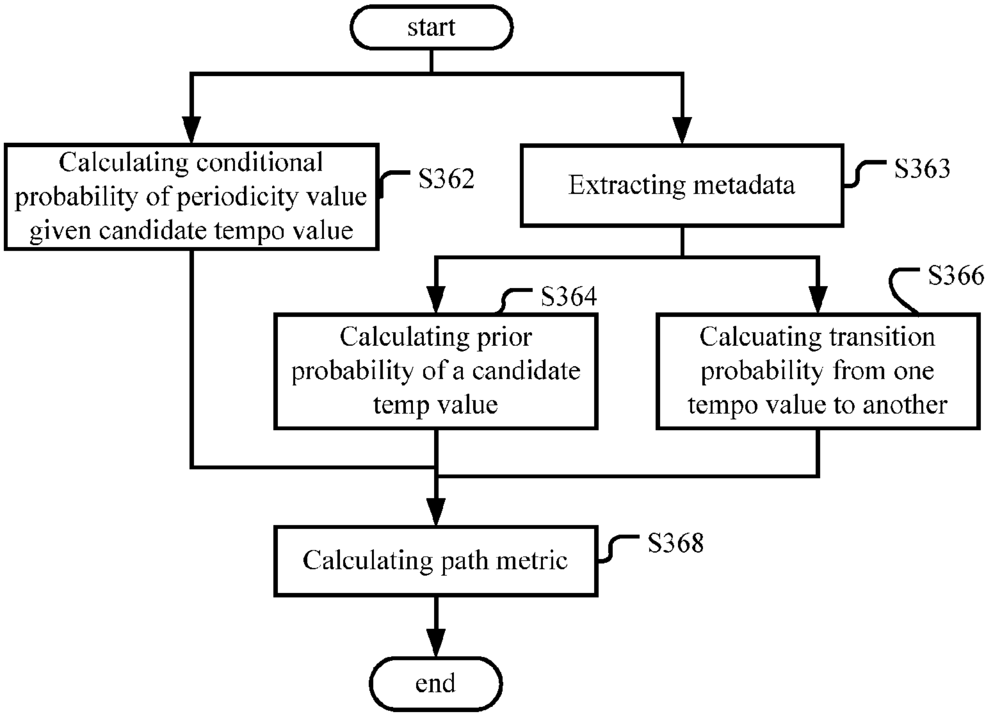
FIG. 17 is a flowchart illustrating the calculating of path metric used in the dynamic programming algorithm.

After getting the accent sequence 20, as shown in FIG. 16, it may be input to a dynamic programming algorithm for outputting an optimal estimated tempo sequence 30 (operation S36). In the dynamic programming algorithm, the optimal tempo sequence 30 may be estimated through minimizing a path metric of a path consisting of a predetermined number of candidate tempo values along time line.

Before the dynamic programming processing, some preprocessing may be conducted. For example, the accent sequence 20 may be smoothed (operation S31) for eliminating noisy peaks in the accent sequence, and or half-wave rectified (operation S31) with respect to a moving average value or history average value of the accent sequence.

In one embodiment, the accent sequence 20 may be divided into overlapped segments (moving windows), and periodicity values within each moving window and with respect to different candidate tempo values may be estimated firstly (operation S33). Then the path metric may be calculated based on the periodicity values with respect to different candidate tempo values (see FIG. 17 and the related description below). Here, a tempo value is estimated for each step of the moving window, the size of the moving window depends on intended precision of the estimated tempo value, and the step size of the moving window depends on intended sensibility with respect to tempo variation.

As further variants of the embodiment, the periodicity values may be further subject to half-wave rectification (operation S34) and/or enhancing processing (operation S35). The half-wave rectification may be conducted in the same manner as the other half-wave rectifications discussed before and may be realized with similar or the same module. The enhancing processing aims to enhance the relative higher periodicity value of the accent sequence in a moving window when the corresponding candidate tempo value tends to be right.

There are different kinds of periodicity values and corresponding estimating algorithm, as discussed before. And one example is autocorrelation values of the accent probability scores within the moving window. In such a case, the autocorrelation value may be further normalized with the size of the moving window and the candidate tempo value. And the enhancing operation S35 may comprise enhancing the autocorrelation values for a specific candidate tempo value with autocorrelation values under a lag being an integer number times of the lag corresponding to the specific candidate tempo value.

Now turn to the path metric, which may be calculated (operation S368) based on at least one of a conditional probability of a periodicity value given a specific candidate tempo value, a prior probability of a specific candidate tempo value, and a probability of transition from one specific tempo value to another specific tempo value in a tempo sequence. The conditional probability of a periodicity value of a specific moving window with respect to a specific candidate tempo value may be estimated based on the periodicity value with regard to the specific candidate tempo value and the periodicity values for all possible candidate tempo values for the specific moving window (operation S362). For a specific moving window, the prior probability of a specific candidate tempo value may be estimated based on the probabilities of possible metadata values corresponding to the specific moving window and conditional probability of the specific tempo value given each possible metadata value of the specific moving window (operation S364). And the probability of transition from a specific tempo value for a moving window to a specific tempo value for the next moving window may be estimated based on the probabilities of possible metadata values corresponding to the moving window or the next moving window and the probability of the specific tempo value for the moving window transiting to the specific tempo value for the next moving window for each of the possible metadata values (operation S366).

The metadata may represent audio types classified based on any standards. It may indicate music genre, style, etc. The metadata may have been encoded in the audio segment and may be simply retrieved/extracted from the information encoded in the audio stream (operation S363). Alternatively, the metadata may be extracted in real time from the audio content of the audio segment corresponding to the moving window (operation S363). For example, the audio segment may be classified into audio types using any kind of classifier.

Figure 18:
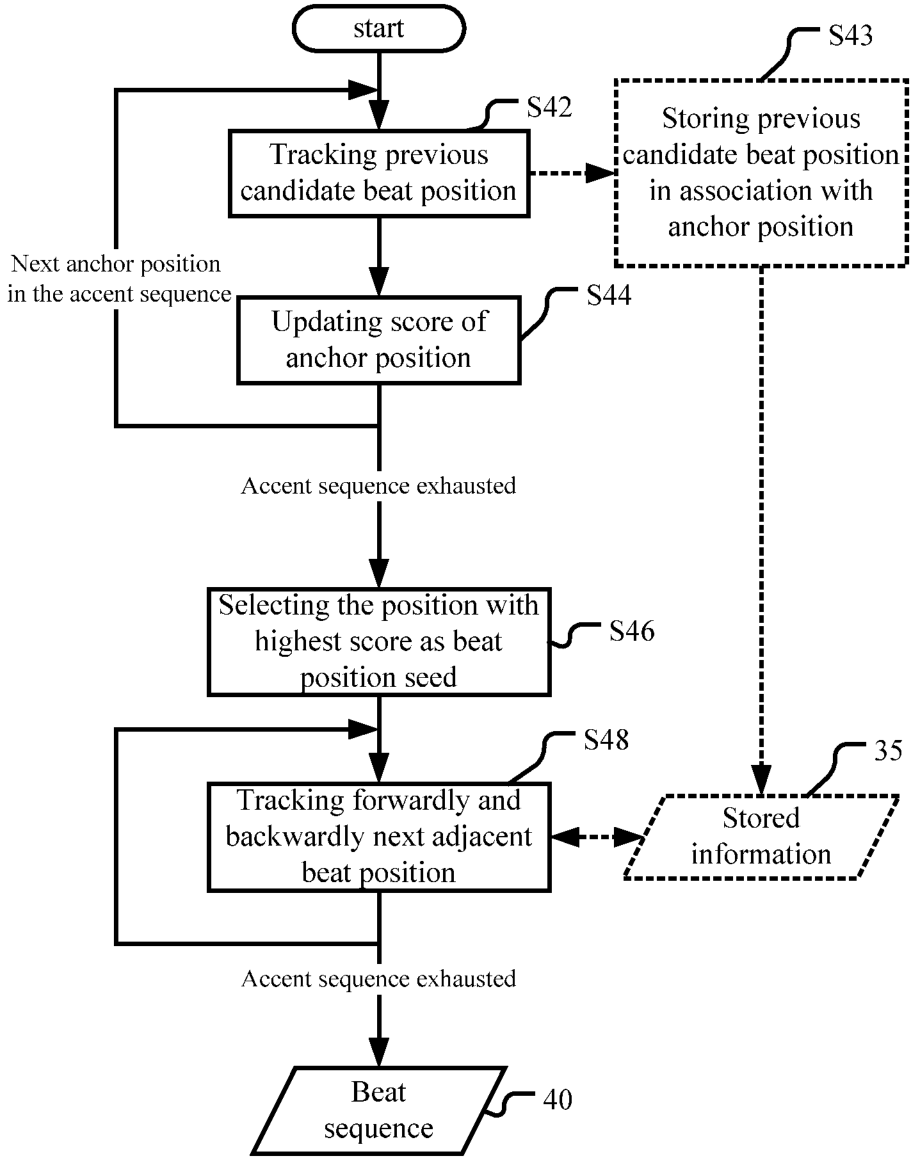
FIGS. 18 and 19 are flowcharts illustrating implementations of the operation of tracking the beat sequence.

Now come to beat tracking. As shown in FIG. 18, all the positions in a section of accent sequence are scanned and each position is used as an anchor position sequentially (the first cycle in FIG. 18). For each anchor position, the previous candidate beat position in the accent sequence is searched based on the tempo sequence (operation S42), and its score may be used to update a score of the anchor position (operation S44). When all the positions are scanned and have their scores updated, the position with the highest score may be selected as a beat position seed (operation S46), based on which the other beat positions in the section are tracked iteratively (the second cycle in FIG. 18) based on the tempo sequence in both forward direction and backward direction of the section (operation S48). The initial value of the old score of a position in the accent sequence before any updating may be determined based on the probability score of accent decision of the corresponding frame. As an example, the probability score may be directly used.

After the beat position seed has been found, the other beat positions may be tracked with an algorithm the same as the tracking operation discussed above. However, considering that the tracking operation has already been done for each position, it might be unnecessary to repeat the operation. Therefore, in a variant as shown with dotted lines in FIG. 18, the previous candidate beat position for each anchor position may be stored in association with the anchor position (operation S43) during the stage of scanning all the anchor positions in the accent sequence. Then during the stage of tracking the other beat positions based on the beat position seed, the stored information 35 may be directly used.

Figure 19:
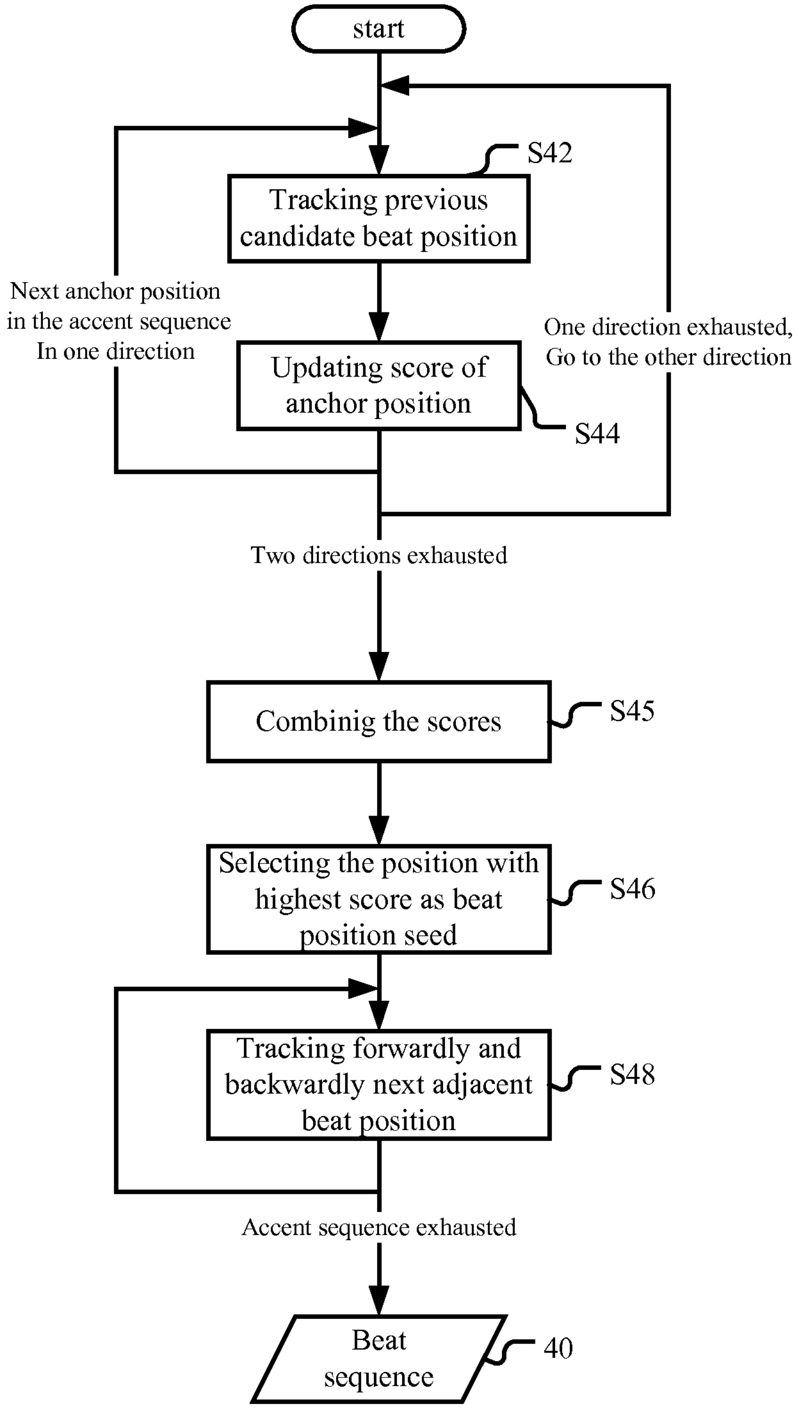

The processing described with reference to FIG. 18 may be executed only once for a section of accent sequence, but may also be executed twice for the same section of accent sequence, in different directions, that is forward direction and backward direction, as shown by the right cycle in FIG. 19. Of course, it does not matter which direction is in the first. Between two cycles, the scores are updated independently. That is, each cycle starts with initial score values of all the positions in the section of accent sequence. Then, two finally updated scores for each position are obtained, and they may be combined together in any manner, for example, summed or multiplied to get a combined score. The beat position seed may be selected based on the combined score. In FIG. 19, the operation S43 shown in FIG. 18 is also applicable.

Figure 20:
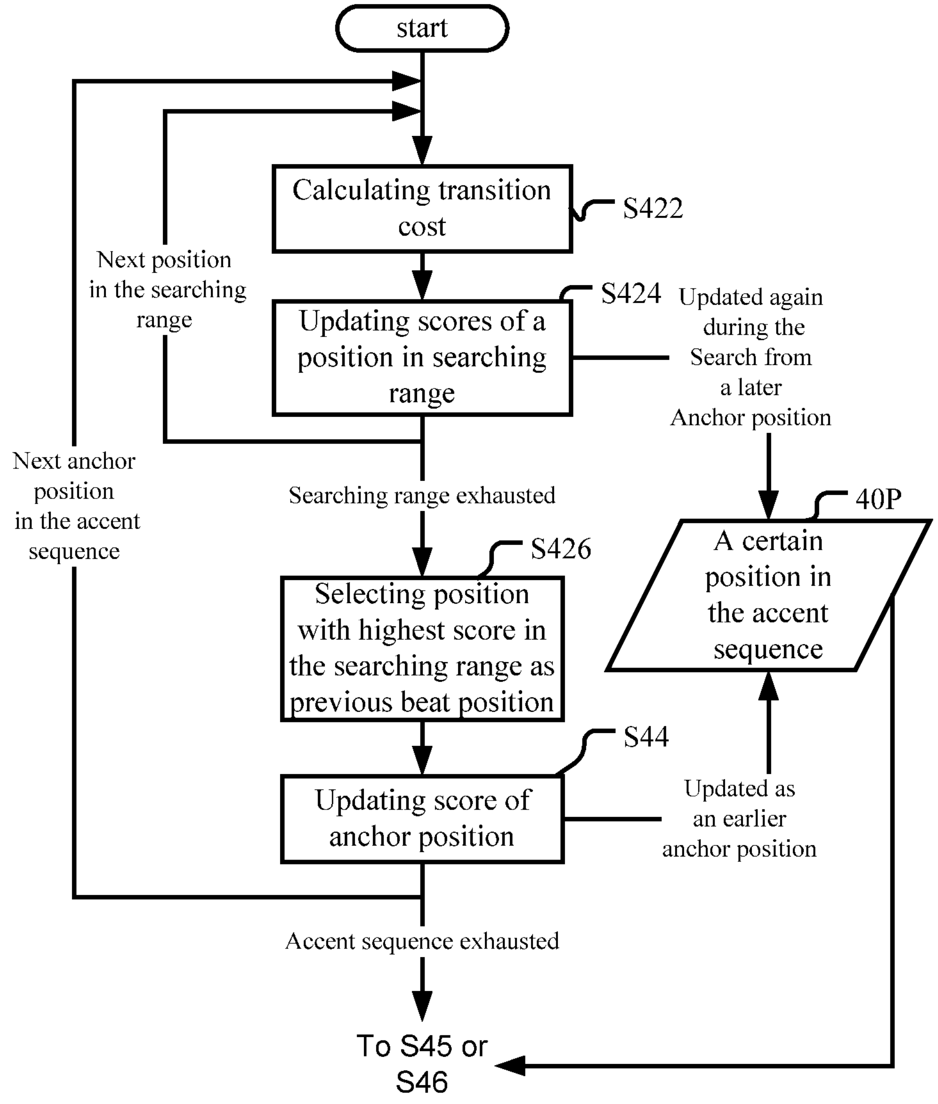
FIG. 20 is a flowchart illustrating the operation of tracking previous candidate beat position in the operation of tracking the beat sequence.

The operation S42 of tracking the previous candidate beat position may be realized with any techniques by searching a searching range determined based on the tempo value at the corresponding position in the tempo sequence (the inner cycle in FIG. 20 and operation S426 in FIG. 20). In one embodiment, the score of each position in the searching range, which has been updated when the position is used as an anchor position (the arrow between operation S44 and 40P in FIG. 20), may be updated again (the arrow between operation S424 and 40P) since a certain position 40P in the accent sequence will firstly be used as an anchor position, and then be covered by searching ranges corresponding to next anchor positions. Note that in addition to the updating when a position is used as an anchor position and the updating when the position is covered by the searching range of the next anchor position for the first time, the same position may be subject to more times of updating because it may be covered by more than one searching range corresponding to more than one subsequent anchor position. In each searching range corresponding to an anchor position, the position having the highest updated score may be selected as the previous candidate beat position (operation S426), and the highest updated score may be used to update the score of the anchor position (operation S44) as described before.

The searching range may be determined based on the tempo value corresponding to the anchor position. For example, based on the tempo value a period between the anchor position and the previous candidate beat position may be estimated, and the searching range may be set as around the previous candidate beat position. Therefore, in the searching range, the positions closer to the estimated previous candidate beat position will have higher weights. A transition cost may be calculated (operation S422) based on such a rule and the score of each position in the searching range may be updated with the transition cost (operation S424). Note again, within the scanning in one direction (forward scanning or backward scanning), the score of each position will be repeatedly updated (and thus accumulated), either as anchor position or when covered by any searching range of any later anchor position. But between two scanning in different directions, the scores are independent, that is the scores in the scanning of a different direction will be updated from beginning, that is from their initial scores determined based on the probability scores of accent decisions of corresponding audio frames.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An audio processing apparatus comprising:

an accent identifier for identifying accent frames from a plurality of audio frames, resulting in an accent sequence comprised of probability scores of accent and/or non-accent decisions with respect to the plurality of audio frames, wherein the accent frames include at least one of an emphasis placed on a particular note and a phonetic prominence given to a particular syllable;

a tempo estimator for estimating a tempo sequence of the plurality of audio frames based on the accent sequence; and an audio processor that uses the tempo sequence to perform an audio processing operation, the audio processing operation including one or more of cover song identification, audio compression control, content-based audio querying and retrieval, automatic audio classification, music structure analysis, music recommendation, music playlist generation, audio to video synchronization, and audio to image synchronization.

2. The audio processing apparatus according to claim 1, wherein the plurality of audio frames are partially overlapped with each other.

3. The audio processing apparatus according to claim 1, wherein the accent identifier comprises:

a first feature extractor for extracting, from each audio frame, at least one attack saliency feature representing the proportion that at least one elementary attack sound component takes in the audio frame; and a classifier for classifying the plurality of audio frames at least based on the at least one attack saliency feature.

4. The audio processing apparatus according to claim 3, wherein the first feature extractor is configured to estimate the at least one attack saliency feature for each audio frame with a decomposition algorithm by decomposing the audio frame into at least one elementary attack sound component, resulting in a matrix of mixing factors of the at least one elementary attack sound component, collectively or individually as the basis of the at least one attack saliency feature.

5. The audio processing apparatus according to claim 3, wherein the first feature extractor further comprises a normalizing unit for normalizing the at least one attack saliency feature of each audio frame with the energy of the audio frame.

6. The audio processing apparatus according to claim 1, wherein the accent identifier comprises:

a second feature extractor for extracting, from each audio frame, at least one relative strength feature representing change of strength of the audio frame with respect to at least one adjacent audio frame, and a classifier for classifying the plurality of audio frames at least based on the at least one relative strength feature.

7. The audio processing apparatus according to claim 6, wherein the accent identifier comprises:

a first feature extractor for extracting, from each audio frame, at least one attack saliency feature representing the proportion that at least one elementary attack sound component takes in the audio frame;

a second feature extractor for extracting, from each audio frame, at least one relative strength feature representing change of strength of the audio frame with respect to at least one adjacent audio frame, and a classifier for classifying the plurality of audio frames at least based on one of the at least one attack saliency feature and the at least one relative strength feature.

8. The audio processing apparatus according to claim 1, wherein the tempo estimator comprises a dynamic programming unit taking the accent sequence as input and outputting an optimal estimated tempo sequence by minimizing a path metric of a path consisting of a predetermined number of candidate tempo values along time line.

9. The audio processing apparatus according to claim 8, wherein the tempo estimator further comprises a second half-wave rectifier for rectifying, before the processing of the dynamic programming unit, the accent sequence with respect to a moving average value or history average value of the accent sequence.

10. The audio processing apparatus according to claim 8, further comprising:

a beat tracking unit for estimating a sequence of beat positions in a section of the accent sequence based on the tempo sequence.

11. An audio processing method comprising:

identifying accent frames from a plurality of audio frames, resulting in an accent sequence comprised of probability scores of accent and/or non-accent decisions with respect to the plurality of audio frames, wherein the accent frames include at least one of an emphasis placed on a particular note and a phonetic prominence given to a particular syllable;

estimating a tempo sequence of the plurality of audio frames based on the accent sequence; and using the tempo sequence to perform an audio processing operation, the audio processing operation including one or more of cover song identification, audio compression control, content-based audio querying and retrieval, automatic audio classification, music structure analysis, music recommendation, music playlist generation, audio to video synchronization, and audio to image synchronization, wherein the audio processing method is implemented with one or more processors and one or more memories, wherein the one or more processors and one or more memories implement an accent identifier and a tempo estimator, wherein the accent identifier identifies the accent frames, and wherein the tempo estimator estimates the tempo sequence.

12. The audio processing method according to claim 11, wherein the plurality of audio frames are partially overlapped with each other.

13. The audio processing method according to claim 11, wherein the identifying operation comprises:

extracting, from each audio frame, at least one attack saliency feature representing the proportion that at least one elementary attack sound component takes in the audio frame; and classifying the plurality of audio frames at least based on the at least one attack saliency feature.

14. The audio processing method according to claim 13, wherein the extracting operation comprises estimating the at least one attack saliency feature for each audio frame with a decomposition algorithm by decomposing the audio frame into at least one elementary attack sound component, resulting in a matrix of mixing factors of the at least one elementary attack sound component, collectively or individually as the basis of the at least one attack saliency feature.

15. The audio processing method according to claim 13, wherein the extracting operation comprises estimating the at least one attack saliency feature with the decomposition algorithm by decomposing each audio frame into at least one elementary attack sound component and at least one elementary non-attack sound component, resulting in a matrix of mixing factors of the at least one elementary attack sound component and the at least one elementary non-attack sound component, collectively or individually as the basis of the at least one attack saliency feature.

16. The audio processing method according to claim 14, wherein the at least one attack sound component is obtained beforehand with the decomposition algorithm from at least one attack sound source.

17. The audio processing method according to claim 14, wherein the at least one elementary attack sound component is derived beforehand from musicology knowledge by manually construction.

18. The audio processing method according to claim 13, further comprising normalizing the at least one attack saliency feature of each audio frame with the energy of the audio frame.

19. An apparatus comprising a processor and configured to perform the method recited in claim 11.

20. A non-transitory computer readable storage medium, comprising software instructions, which when executed by one or more processors cause performance of the method recited in claim 11.

* * * * *